(12) United States Patent
Lee et al.

(10) Patent No.: US 11,916,824 B2
(45) Date of Patent: Feb. 27, 2024

(54) METHOD AND TERMINAL FOR TRANSMITTING FEEDBACK SIGNAL IN WIRELESS COMMUNICATION SYSTEM

(71) Applicant: LG ELECTRONICS INC., Seoul (KR)

(72) Inventors: Seungmin Lee, Seoul (KR); Hanbyul Seo, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 416 days.

(21) Appl. No.: 17/419,185

(22) PCT Filed: Dec. 30, 2019

(86) PCT No.: PCT/KR2019/018691
§ 371 (c)(1),
(2) Date: Jun. 28, 2021

(87) PCT Pub. No.: WO2020/139051
PCT Pub. Date: Jul. 2, 2020

(65) Prior Publication Data
US 2022/0116168 A1 Apr. 14, 2022

(30) Foreign Application Priority Data
Dec. 28, 2018 (KR) .................. 10-2018-0172877

(51) Int. Cl.
*H04L 5/00* (2006.01)
*H04W 56/00* (2009.01)

(52) U.S. Cl.
CPC ........... *H04L 5/0048* (2013.01); *H04W 56/00* (2013.01)

(58) Field of Classification Search
None
See application file for complete search history.

(56) References Cited

U.S. PATENT DOCUMENTS

| 7,586,976 B1 * | 9/2009 | Duggan .............. H04L 27/2647 370/461 |
| 2012/0032855 A1 | 2/2012 | Reede et al. |
| 2019/0254113 A1 * | 8/2019 | Berger .................. H04W 72/23 |

FOREIGN PATENT DOCUMENTS

| CN | 101615921 A | * 12/2009 | |
| WO | WO-2005088853 A1 | * 9/2005 | ............. H04J 13/16 |
| WO | 2014043237 | 3/2014 | |
| WO | 2015167317 | 11/2015 | |
| WO | 2018159913 | 9/2018 | |
| WO | 2018186663 | 10/2018 | |

OTHER PUBLICATIONS

PCT International Application No. PCT/KR2019/018691, International Search Report dated Apr. 21, 2020, 13 pages.

* cited by examiner

*Primary Examiner* — Alex Skripnikov
(74) *Attorney, Agent, or Firm* — LEE, HONG, DEGERMAN, KANG & WAIMEY

(57) ABSTRACT

An embodiment of the present disclosure proposes a method for transmitting a feedback signal by a reception terminal in a wireless communication system, the method comprising the steps of: receiving a first reference signal and a second reference signal from a transmission terminal by the reception terminal; and transmitting a feedback signal to the transmission terminal by the reception terminal on the basis of the first reference signal and the second reference signal.

15 Claims, 20 Drawing Sheets

(a) DMRS location for Rel. 12/13 PSBCH (b) DMRS location for V2V PSBCH (a)

(b)

(a)

(b)

(a)

(b)

METHOD AND TERMINAL FOR TRANSMITTING FEEDBACK SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2019/018691, filed on Dec. 30, 2019, which claims the benefit of earlier filing date and right of priority to Korean Application No. 10-2018-0172877, filed on Dec. 28, 2018, the contents of which are all incorporated by reference herein in their entirety.

TECHNICAL FIELD

The present disclosure relates to a wireless communication system, and more particularly to a method and a user equipment (UE) for transmitting a feedback signal.

BACKGROUND ART

As more and more communication devices demand larger communication capacities, the need for enhanced mobile broadband communication relative to the legacy radio access technologies (RATs) has emerged. Massive machine type communication (mMTC) that provides various services by interconnecting multiple devices and things irrespective of time and place is also one of main issues to be addressed for future-generation communications. A communication system design considering services/user equipments (UEs) sensitive to reliability and latency is under discussion as well. As such, the introduction of a future-generation RAT considering enhanced mobile broadband (eMBB), mMTC, ultra-reliability and low latency communication (URLLC), and so on is being discussed. For convenience, this technology is referred to as new RAT (NR) in the present disclosure. NR is an exemplary 5th generation (5G) RAT.

A new RAT system including NR adopts orthogonal frequency division multiplexing (OFDM) or a similar transmission scheme. The new RAT system may use OFDM parameters different from long term evolution (LTE) OFDM parameters. Further, the new RAT system may have a larger system bandwidth (e.g., 100 MHz), while following the legacy LTE/LTE-advanced (LTE-A) numerology. Further, one cell may support a plurality of numerologies in the new RAT system. That is, UEs operating with different numerologies may co-exist within one cell.

Vehicle-to-everything (V2X) is a communication technology of exchanging information between a vehicle and another vehicle, a pedestrian, or infrastructure. V2X may cover four types of communications such as vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

DISCLOSURE

Technical Problem

An object of the present disclosure is to provide a method for transmitting a transmitting a feedback signal by a reception (Rx) user equipment (UE) in a wireless communication system.

Another object of the present disclosure is to provide a method for feeding back information of a time difference between frequency domains when a user equipment (UE) transmits a ranging signal (i.e., a signal for distance measurement) and a positioning signal in a plurality of frequency domains (e.g., band/carrier).

Another object of the present disclosure is to provide a method for measuring the distance between a transmission (Tx) UE and a reception (Rx) UE.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

In accordance with an aspect of the present disclosure, a method for transmitting a feedback signal by a reception user equipment (UE) in a wireless communication system may include receiving, by the reception user equipment (UE), a first reference signal and a second reference signal from a transmission user equipment (UE), and transmitting, by the reception user equipment (UE), the feedback signal to the transmission user equipment (UE) based on the first reference signal and the second reference signal.

The feedback signal may include information about a time difference between a first FFT (Fast Fourier Transform) window for receiving the first reference signal and a second FFT window for receiving the second reference signal.

The distance between the transmission user equipment (UE) and the reception user equipment (UE) may be calculated based on a time difference between the first FFT window and the second FFT window.

The receiving may include receiving the first reference signal through a first frequency domain, and receiving the second reference signal through a second frequency domain different from the first frequency domain.

The feedback signal may further include information about the first FFT window and information about the second FFT window.

The method may further include acquiring, by the reception user equipment (UE), a phase difference between the first reference signal and the second reference signal, the phase difference being caused by a first radio frequency (RF) chain for receiving the first reference signal and a second radio frequency (RF) chain for receiving the second reference signal.

The transmitting may include transmitting the feedback signal including information about the phase difference to the transmission user equipment (UE).

The distance between the transmission user equipment (UE) and the reception user equipment (UE) may be calculated based on the phase difference information.

The method may further include calculating a time difference between a first transmission time point where the transmission user equipment (UE) transmits the first reference signal and a second transmission time point where the transmission user equipment (UE) transmits the second reference signal, based on a time difference between a first reception time point where the reception user equipment (UE) receives the first reference signal and a second reception time point where the reception user equipment (UE) receives the second reference signal.

The feedback signal further may include information about a time difference between the first reception time point where the reception user equipment (UE) receives the first reference signal and the second reception time point where the reception user equipment (UE) receives the second reference signal.

The feedback signal may include a first feedback signal corresponding to the first reference signal and a second feedback signal corresponding to the second reference signal.

The method may further include transmitting, by the reception user equipment (UE), at least one of first information about a time difference between the first reception time point and a third transmission time point where the reception user equipment (UE) transmits the first feedback signal, and second information about a time difference between the second reception time point and a fourth transmission time point where the reception user equipment (UE) transmits the second feedback signal, to the transmission user equipment (UE).

The distance between the transmission user equipment (UE) and the reception user equipment (UE) may be calculated based on at least one of the first information indicating a time difference between the third transmission time point and the first reception time point and the second information indicating a time difference between the fourth transmission time point and the second reception time point.

The feedback signal may include a first feedback signal corresponding to the first reference signal and a second feedback signal corresponding to the second reference signal.

The method may further include transmitting, by the reception user equipment (UE), at least one of first information about a time difference between the third transmission time point where the reception user equipment (UE) transmits the first feedback signal and the fourth transmission time point where the reception user equipment (UE) transmits the second feedback signal, to the transmission user equipment (UE).

The distance between the transmission user equipment (UE) and the reception user equipment (UE) may be calculated based on information about a time difference between the third transmission time point and the fourth transmission time point.

The distance between the transmission user equipment (UE) and the reception user equipment (UE) may be calculated further based on a time difference between a transmission time point where the first reference signal is transmitted and a transmission time point where the second reference signal is transmitted.

The reference signal may be a reference signal for positioning or a reference signal for ranging.

In accordance with an aspect of the present disclosure, a reception user equipment (UE) for transmitting a feedback signal in a wireless communication system may include a transceiver and a processor.

The processor may be configured to: receive a first reference signal and a second reference signal from a transmission user equipment (UE), and transmit the feedback signal to the transmission user equipment (UE) based on the first reference signal and the second reference signal.

The feedback signal may include information about a time difference between a first FFT (Fast Fourier Transform) window for receiving the first reference signal and a second FFT window for receiving the second reference signal.

The distance between the transmission user equipment (UE) and the reception user equipment (UE) may be calculated based on a time difference between the first FFT window and the second FFT window.

Advantageous Effects

The embodiments of the present disclosure can improve the accuracy of distance measurement (i.e., UE ranging) of a user equipment (UE) by widening an effective bandwidth using multiple carriers for precise positioning of the UE.

Further, according to the embodiments of the present disclosure, when the distance between one UE and another UE is measured using multiple carriers, if a transmission (Tx) time delay between the UEs occurs, information of the transmission (Tx) time delay is signaled, so that the UE-to-UE distance can be more precisely measured.

In addition, the embodiments of the present disclosure need not always transmit and receive all signals to and from the actual wideband, and are designed to separately transmit and receive signals through bands spaced apart from each other by a predetermined frequency spacing or more, so that the UE-to-UE distance can be more precisely measured and RF signal latency can also be measured.

According to the embodiments of the present disclosure, one of two frequency domains is selected, and a time difference between Tx and Rx time points is fed back to the selected frequency domain, so that the amount of signalling overhead can be cut in half.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of embodiment(s), illustrate various embodiments and together with the description of the specification serve to explain the principle of the specification.

BEST MODE

Figure 1:
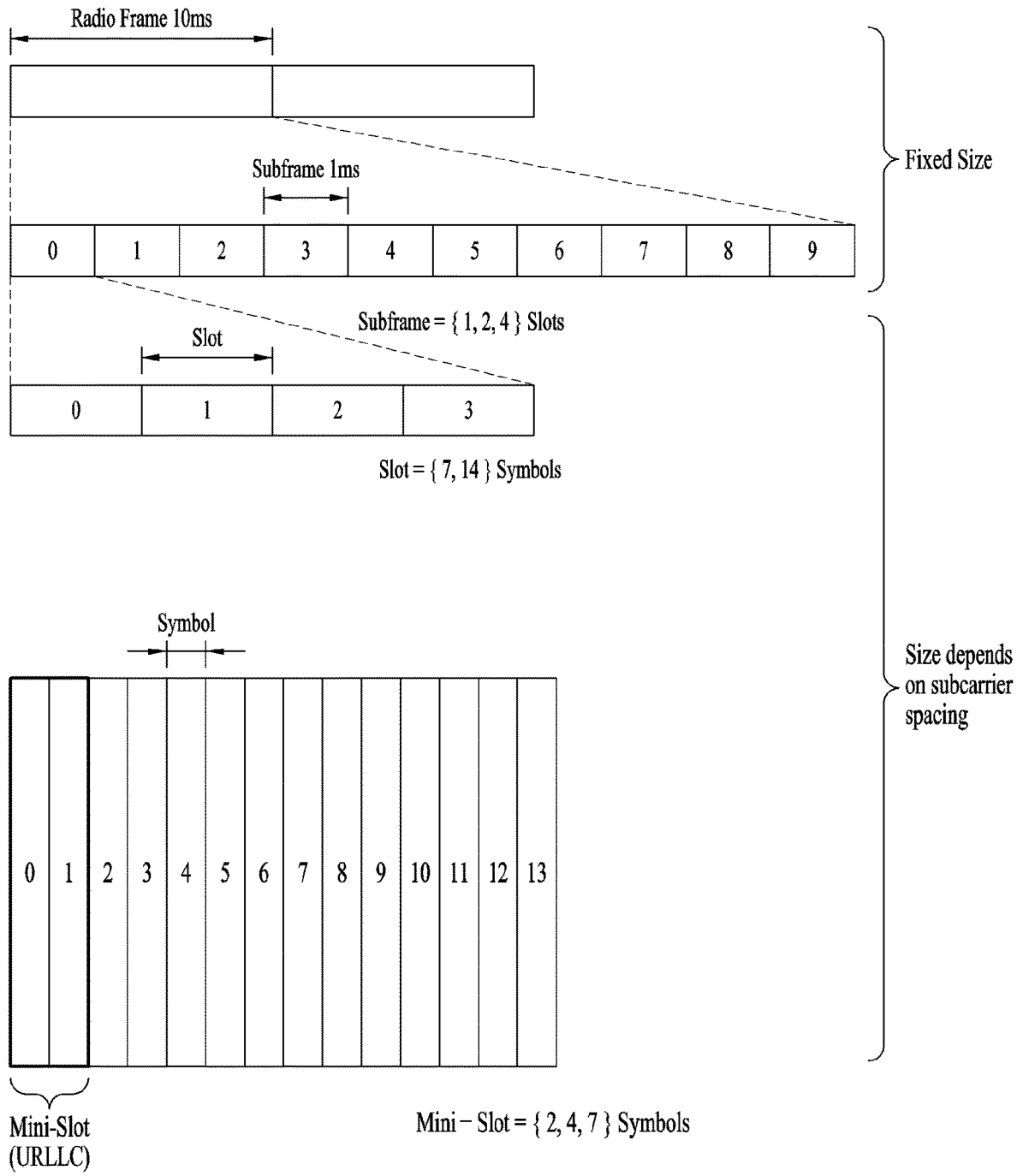
FIG. 1 illustrates a frame structure in new radio (NR).

In this document, downlink (DL) communication refers to communication from a base station (BS) to a user equipment (UE), and uplink (UL) communication refers to communication from the UE to the BS. In DL, a transmitter may be a part of the BS and a receiver may be a part of the UE. In UL, a transmitter may be a part of the UE and a receiver may be a part of the BS. Herein, the BS may be referred to as a first communication device, and the UE may be referred to as a second communication device. The term 'BS' may be replaced with 'fixed station', 'Node B', 'evolved Node B (eNB)', 'next-generation node B (gNB)', 'base transceiver system (BTS)', 'access point (AP)', 'network node', 'fifth-generation (5G) network node', 'artificial intelligence (AI) system', 'road side unit (RSU)', 'robot', etc. The term 'UE' may be replaced with 'terminal', 'mobile station (MS)', 'user terminal (UT)', 'mobile subscriber station (MSS)', 'subscriber station (SS)', 'advanced mobile station (AMS)', 'wireless terminal (WT)', 'machine type communication (MTC) device', 'machine-to-machine (M2M) device', 'device-to-device (D2D) device', 'vehicle', 'robot', 'AI module', etc.

The technology described herein is applicable to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented as radio technology such as universal terrestrial radio access (UTRA) or CDMA2000. The TDMA may be implemented as radio technology such as global system for mobile communications (GSM), general packet radio service (GPRS), or enhanced data rates for GSM evolution (EDGE). The OFDMA may be implemented as radio technology such as the Institute of Electrical and Electronics Engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3rd generation partnership project (3GPP) long term evolution (LTE) is a part of evolved UMTS (E-UMTS) using E-UTRA. LTE-advance (LTE-A) or LTE-A pro is an evolved version of 3GPP LTE. 3GPP new radio or new radio access technology (3GPP NR) is an evolved version of 3GPP LTE, LTE-A, or LTE-A pro.

Although the present disclosure is described based on 3GPP communication systems (e.g., LTE-A, NR, etc.) for clarity of description, the spirit of the present disclosure is not limited thereto. LTE refers to technologies beyond 3GPP technical specification (TS) 36.xxx Release 8. In particular, LTE technologies beyond 3GPP TS 36.xxx Release 10 are referred to as LTE-A, and LTE technologies beyond 3GPP TS 36.xxx Release 13 are referred to as LTE-A pro. 3GPP NR refers to technologies beyond 3GPP TS 38.xxx Release 15. LTE/NR may be called '3GPP system'. Herein, "xxx" refers to a standard specification number.

In the present disclosure, a node refers to a fixed point capable of transmitting/receiving a radio signal for communication with a UE. Various types of BSs may be used as the node regardless of the names thereof. For example, the node may include a BS, a node B (NB), an eNB, a pico-cell eNB (PeNB), a home eNB (HeNB), a relay, a repeater, etc. A device other than the BS may be the node. For example, a radio remote head (RRH) or a radio remote unit (RRU) may be the node. The RRH or RRU generally has a lower power level than that of the BS. At least one antenna is installed for each node. The antenna may refer to a physical antenna or mean an antenna port, a virtual antenna, or an antenna group. The node may also be referred to as a point.

In the present disclosure, a cell refers to a prescribed geographical area in which one or more nodes provide communication services or a radio resource. When a cell refers to a geographical area, the cell may be understood as the coverage of a node where the node is capable of providing services using carriers. When a cell refers to a radio resource, the cell may be related to a bandwidth (BW), i.e., a frequency range configured for carriers. Since DL coverage, a range within which the node is capable of transmitting a valid signal, and UL coverage, a range within which the node is capable of receiving a valid signal from the UE, depend on carriers carrying the corresponding signals, the coverage of the node may be related to the coverage of the cell, i.e., radio resource used by the node. Accordingly, the term "cell" may be used to indicate the service coverage of a node, a radio resource, or a range to which a signal transmitted on a radio resource can reach with valid strength.

In the present disclosure, communication with a specific cell may mean communication with a BS or node that provides communication services to the specific cell. In addition, a DL/UL signal in the specific cell refers to a DL/UL signal from/to the BS or node that provides communication services to the specific cell. In particular, a cell providing DL/UL communication services to a UE may be called a serving cell. The channel state/quality of the specific cell may refer to the channel state/quality of a communication link formed between the BS or node, which provides communication services to the specific cell, and the UE.

When a cell is related to a radio resource, the cell may be defined as a combination of DL and UL resources, i.e., a combination of DL and UL component carriers (CCs). The cell may be configured to include only DL resources or a combination of DL and UL resources. When carrier aggregation is supported, a linkage between the carrier frequency of a DL resource (or DL CC) and the carrier frequency of a UL resource (or UL CC) may be indicated by system information transmitted on a corresponding cell. The carrier frequency may be equal to or different from the center frequency of each cell or CC. A cell operating on a primary frequency may be referred to as a primary cell (Pcell) or PCC, and a cell operating on a secondary frequency may be referred to as a secondary cell (Scell) or SCC. The Scell may be configured after the UE and BS establish a radio resource control (RRC) connection therebetween by performing an RRC connection establishment procedure, that is, after the UE enters the RRC_CONNECTED state. The RRC connection may mean a path that enables the RRC of the UE and the RRC of the BS to exchange an RRC message. The Scell may be configured to provide additional radio resources to the UE. The Scell and the Pcell may form a set of serving cells for the UE depending on the capabilities of the UE. When the UE is not configured with carrier aggregation or does not support the carrier aggregation although the UE is in the RRC_CONNECTED state, only one serving cell configured with the Pcell exists.

A cell supports a unique radio access technology (RAT). For example, transmission/reception in an LTE cell is performed based on the LTE RAT, and transmission/reception in a 5G cell is performed based on the 5G RAT.

The carrier aggregation is a technology for combining a plurality of carriers each having a system BW smaller than a target BW to support broadband. The carrier aggregation is different from OFDMA in that in the former, DL or UL communication is performed on a plurality of carrier frequencies each forming a system BW (or channel BW) and in the latter, DL or UL communication is performed by dividing a base frequency band into a plurality of orthogonal subcarriers and loading the subcarriers in one carrier frequency. For example, in OFDMA or orthogonal frequency division multiplexing (OFDM), one frequency band with a predetermined system BW is divided into a plurality of subcarriers with a predetermined subcarrier spacing, and information/data is mapped to the plurality of subcarriers. Frequency up-conversion is applied to the frequency band to which the information/data is mapped, and the information/data is transmitted on the carrier frequency in the frequency band. In wireless carrier aggregation, multiple frequency bands, each of which has its own system BW and carrier frequency, may be simultaneously used for communication, and each frequency band used in the carrier aggregation may be divided into a plurality of subcarriers with a predetermined subcarrier spacing.

3GPP communication specifications define DL physical channels corresponding to resource elements carrying information originating from higher (upper) layers of physical layers (e.g., a medium access control (MAC) layer, a radio link control (RLC) layer, a protocol data convergence protocol (PDCP) layer, an RRC layer, a service data adaptation protocol (SDAP) layer, a non-access stratum (NAS) layer, etc.) and DL physical signals corresponding to resource elements which are used by physical layers but do not carry information originating from higher layers. For example, a physical downlink shared channel (PDSCH), a physical broadcast channel (PBCH), a physical multicast channel (PMCH), a physical control format indicator channel (PCFICH), and a physical downlink control channel (PDCCH) are defined as the DL physical channels, and a reference signal and a synchronization signal are defined as the DL physical signals. A reference signal (RS), which is called a pilot signal, refers to a predefined signal with a specific waveform known to both the BS and UE. For example, a cell-specific RS (CRS), a UE-specific RS (UE-RS), a positioning RS (PRS), a channel state information RS (CSI-RS), and a demodulation reference signal (DMRS) may be defined as DL RSs. In addition, the 3GPP communication specifications define UL physical channels corresponding to resource elements carrying information originating from higher layers and UL physical signals corresponding to resource elements which are used by physical layers but do not carry information originating from higher layers. For example, a physical uplink shared channel (PUSCH), a physical uplink control channel (PUCCH), and a physical random access channel (PRACH) are defined as the UL physical channels, and a demodulation reference signal (DMRS) for a UL control/data signal and a sounding reference signal (SRS) used for UL channel measurement are defined as the UL physical signals.

In the present disclosure, the PDCCH and the PDSCH may refer to a set of time-frequency resources or resource elements carrying downlink control information (DCI) of the physical layer and a set of time-frequency resources or resource elements carrying DL data thereof, respectively. The PUCCH, the PUSCH, and the PRACH may refer to a set of time-frequency resources or resource elements carrying uplink control information (UCI) of the physical layer, a set of time-frequency resources or resource elements carrying UL data thereof, and a set of time-frequency resources or resource elements carrying random access signals thereof, respectively. When it is said that a UE transmits a UL physical channel (e.g., PUCCH, PUSCH, PRACH, etc.), it may mean that the UE transmits UCI, UL data, or a random access signal on or over the corresponding UL physical channel. When it is said that the BS receives a UL physical channel, it may mean that the BS receives UCI, UL data, a random access signal on or over the corresponding UL physical channel. When it is said that the BS transmits a DL physical channel (e.g., PDCCH, PDSCH, etc.), it may mean that the BS transmits DCI or UL data on or over the corresponding DL physical channel. When it is said that the UE receives a DL physical channel, it may mean that the UE receives DCI or UL data on or over the corresponding DL physical channel.

In the present disclosure, a transport block may mean the payload for the physical layer. For example, data provided from the higher layer or MAC layer to the physical layer may be referred to as the transport block.

In the present disclosure, hybrid automatic repeat request (HARQ) may mean a method used for error control. A HARQ acknowledgement (HARQ-ACK) transmitted in DL is used to control an error for UL data, and a HARQ-ACK transmitted in UL is used to control an error for DL data. A transmitter that performs the HARQ operation waits for an ACK signal after transmitting data (e.g. transport blocks or codewords). A receiver that performs the HARQ operation transmits an ACK signal only when the receiver correctly receives data. If there is an error in the received data, the receiver transmits a negative ACK (NACK) signal. Upon receiving the ACK signal, the transmitter may transmit (new) data but, upon receiving the NACK signal, the transmitter may retransmit the data. Meanwhile, there may be a time delay until the BS receives ACK/NACK from the UE and retransmits data after transmitting scheduling information and data according to the scheduling information. The time delay occurs due to a channel propagation delay or a time required for data decoding/encoding. Accordingly, if new data is transmitted after completion of the current HARQ process, there may be a gap in data transmission due to the time delay. To avoid such a gap in data transmission during the time delay, a plurality of independent HARQ processes are used. For example, when there are 7 transmission occasions between initial transmission and retransmission, a communication device may perform data transmission with no gap by managing 7 independent HARQ processes. When the communication device uses a plurality of parallel HARQ processes, the communication device may successively perform UL/DL transmission while waiting for HARQ feedback for previous UL/DL transmission.

In the present disclosure, CSI collectively refers to information indicating the quality of a radio channel (also called a link) created between a UE and an antenna port. The CSI includes at least one of a channel quality indicator (CQI), a precoding matrix indicator (PMI), a CSI-RS resource indicator (CRI), an SSB resource indicator (SSBRI), a layer indicator (LI), a rank indicator (RI), or a reference signal received power (RSRP).

In the present disclosure, frequency division multiplexing (FDM) may mean that signals/channels/users are transmitted/received on different frequency resources, and time division multiplexing (TDM) may mean that signals/channels/users are transmitted/received on different time resources.

In the present disclosure, frequency division duplex (FDD) refers to a communication scheme in which UL communication is performed on a UL carrier and DL communication is performed on a DL carrier linked to the UL carrier, and time division duplex (TDD) refers to a communication scheme in which UL and DL communication are performed by splitting time.

The details of the background, terminology, abbreviations, etc. used herein may be found in documents published before the present disclosure. For example, 3GPP TS 24 series, 3GPP TS 34 series, and 3GPP TS 38 series may be referenced (http://www.3gpp.org/specifications/specification-numbering).

Frame Structure

FIG. 1 is a diagram illustrating a frame structure in NR.

The NR system may support multiple numerologies. The numerology is defined by a subcarrier spacing and cyclic prefix (CP) overhead. A plurality of subcarrier spacings may be derived by scaling a basic subcarrier spacing by an integer N (or $\mu$). The numerology may be selected independently of the frequency band of a cell although it is assumed that a small subcarrier spacing is not used at a high carrier frequency. In addition, the NR system may support various frame structures based on the multiple numerologies.

Hereinafter, an OFDM numerology and a frame structure, which may be considered in the NR system, will be described. Table 1 shows multiple OFDM numerologies supported in the NR system. The value of $\mu$ for a bandwidth part and a CP may be obtained by RRC parameters provided by the BS.

TABLE 1

| $\mu$ | $\Delta f = 2^\mu * 15$ [kHz] | Cyclic prefix (CP) |
| --- | --- | --- |
| 0 | 15 | Normal |
| 1 | 30 | Normal |
| 2 | 60 | Normal, Extended |
| 3 | 120 | Normal |
| 4 | 240 | Normal |

The NR system supports multiple numerologies (e.g., subcarrier spacings) to support various 5G services. For example, the NR system supports a wide area in conventional cellular bands in a subcarrier spacing of 15 kHz and supports a dense urban environment, low latency, and wide carrier BW in a subcarrier spacing of 30/60 kHz. In a subcarrier spacing of 60 kHz or above, the NR system supports a BW higher than 24.25 GHz to overcome phase noise.

Resource Grid

Figure 2:
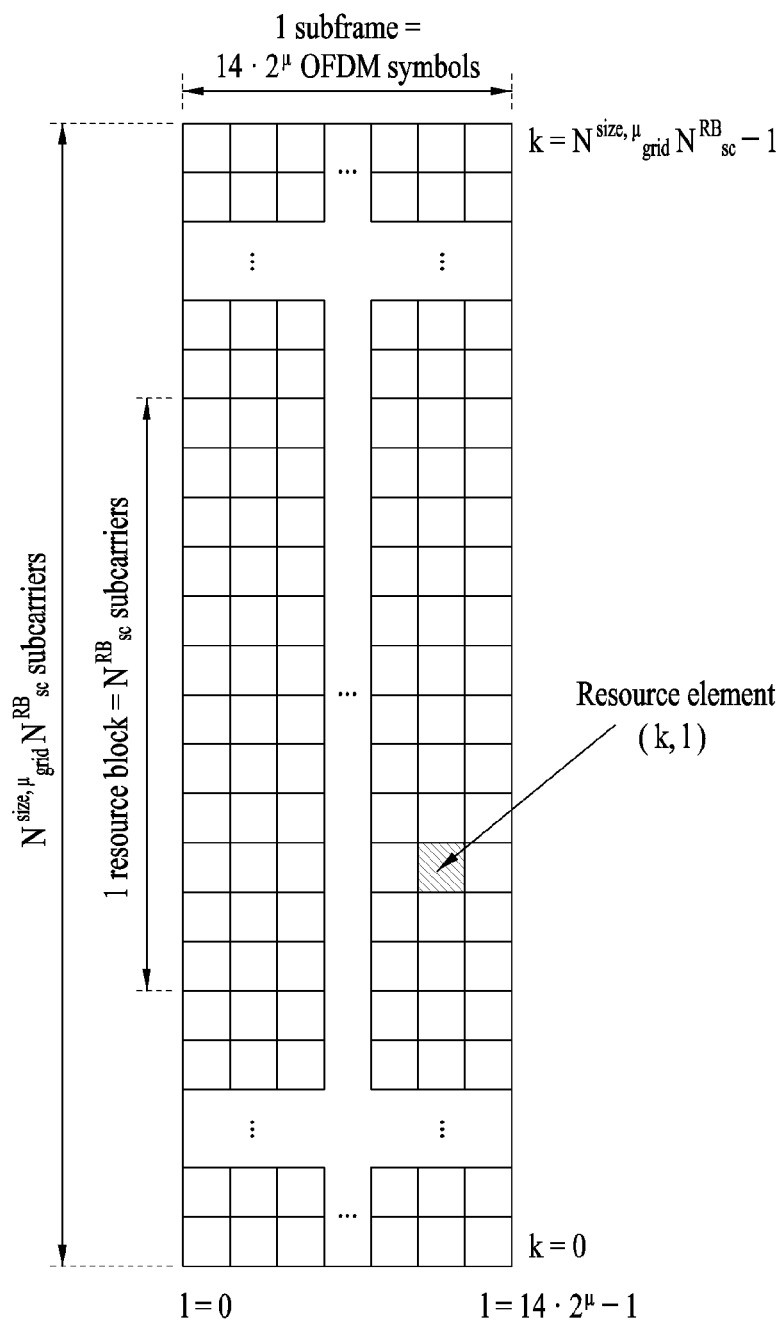
FIG. 2 illustrates a radio grid in NR.

FIG. 2 illustrates a resource grid in the NR.

Referring to FIG. 2, a resource grid consisting of $N^{size,\mu}_{grid}*N^{RB}_{sc}$ subcarriers and $14*2^\mu$ OFDM symbols may be defined for each subcarrier spacing configuration and carrier, where $N^{size,\mu}_{grid}$ is indicated by RRC signaling from the BS. $N^{size,\mu}_{grid}$ may vary not only depending on the subcarrier spacing configuration $\mu$ but also between UL and DL. One resource grid exists for the subcarrier spacing configuration $\mu$, an antenna port p, and a transmission direction (i.e., UL or DL). Each element in the resource gird for the subcarrier spacing configuration $\mu$ and the antenna port p may be referred to as a resource element and identified uniquely by an index pair of (k, l), where k denotes an index in the frequency domain and l denotes the relative location of a symbol in the frequency domain with respect to a reference point. The resource element (k, l) for the subcarrier spacing configuration $\mu$ and the antenna port p may be a physical resource and a complex value, $a(p,\mu)_{k,l}$. A resource block (RB) is defined as $N^{RB}_{sc}$ consecutive subcarriers in the frequency domain (where $N^{RB}_{sc}=12$).

Considering the point that the UE is incapable of supporting a wide BW supported in the NR system, the UE may be configured to operate in a part of the frequency BW of a cell (hereinafter referred to as a bandwidth part (BWP)).

Bandwidth Part (BWP)

The NR system may support up to 400 MHz for each carrier. If the UE always keeps a radio frequency (RF) module on for all carriers while operating on such a wideband carrier, the battery consumption of the UE may increase. Considering multiple use cases (e.g., eMBB, URLLC, mMTC, V2X, etc.) operating in one wideband carrier, a different numerology (e.g., subcarrier spacing) may be supported for each frequency band of the carrier. Further, considering that each UE may have a different capability regarding the maximum BW, the BS may instruct the UE to operate only in a partial BW rather than the whole BW of the wideband carrier. The partial bandwidth is referred to as the BWP. The BWP is a subset of contiguous common RBs defined for numerology $\mu i$ in BWP i of the carrier in the frequency domain, and one numerology (e.g., subcarrier spacing, CP length, and/or slot/mini-slot duration) may be configured for the BWP.

The BS may configure one or more BWPs in one carrier configured for the UE. Alternatively, if UEs are concentrated in a specific BWP, the BS may move some UEs to another BWP for load balancing. For frequency-domain inter-cell interference cancellation between neighbor cells, the BS may configure BWPs on both sides of a cell except for some central spectra in the whole BW in the same slot. That is, the BS may configure at least one DL/UL BWP for the UE associated with the wideband carrier, activate at least one of DL/UL BWP(s) configured at a specific time (by L1 signaling which is a physical-layer control signal, a MAC control element (CE) which is a MAC-layer control signal, or RRC signaling), instruct the UE to switch to another configured DL/UL BWP (by L1 signaling, a MAC CE, or RRC signaling), or set a timer value and switch the UE to a predetermined DL/UL BWP upon expiration of the timer value. In particular, an activated DL/UL BWP is referred to as an active DL/UL BWP. While performing initial access or before setting up an RRC connection, the UE may not receive a DL/UL BWP configuration. A DL/UL BWP that the UE assumes in this situation is referred to as an initial active DL/UL BWP.

Synchronization Acquisition of Sidelink UE

In time division multiple access (TDMA) and frequency division multiple access (FDMA) systems, accurate time and frequency synchronization is essential. If time and frequency synchronization is not accurate, inter-symbol interference (ISI) and inter-carrier interference (ICI) may occur so that system performance may be degraded. This may occur in V2X. For time/frequency synchronization in V2X, a sidelink synchronization signal (SLSS) may be used in the physical layer, and master information block-sidelink-V2X (MIB-SL-V2X) may be used in the RLC layer.

Figure 3:
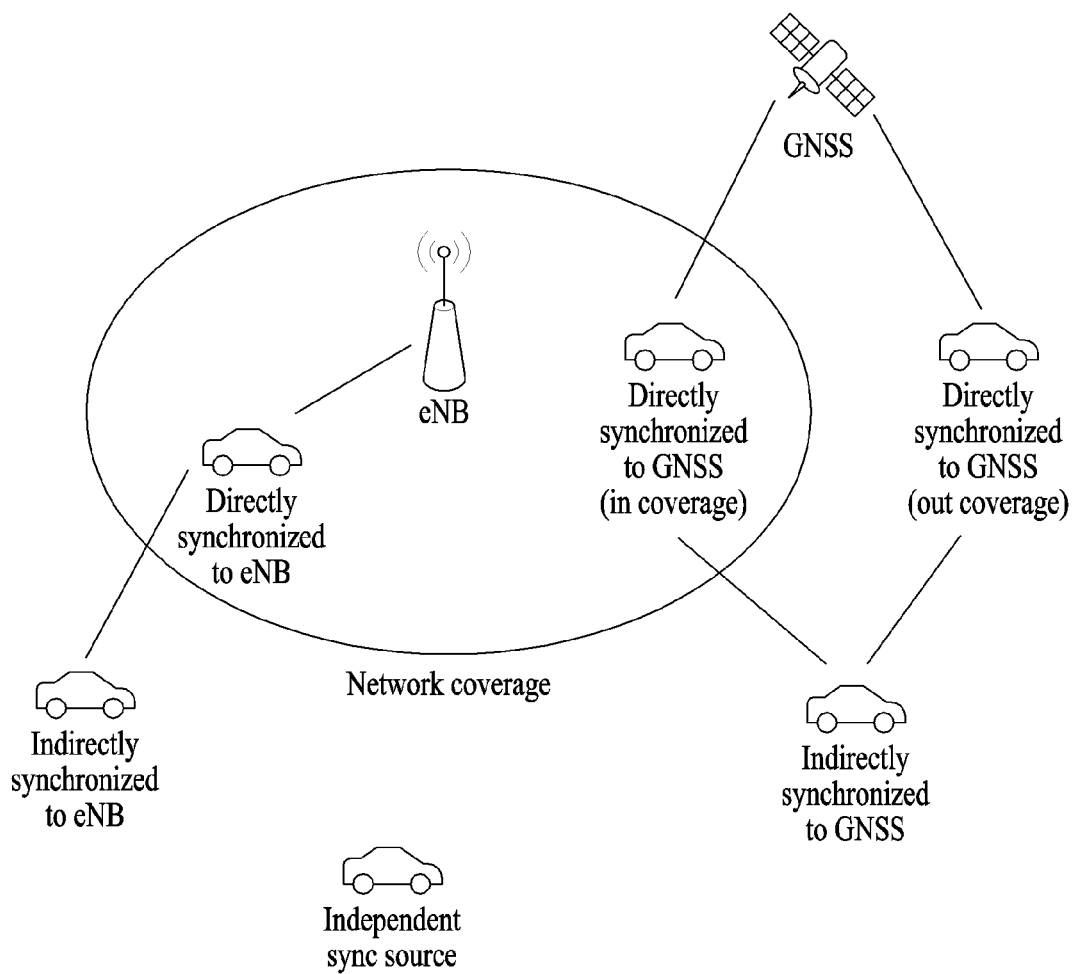
FIG. 3 illustrates sidelink synchronization.

FIG. 3 illustrates a synchronization source and a synchronization reference in V2X.

Referring to FIG. 3, in V2X, a UE may be directly synchronized to global navigation satellite systems (GNSS) or indirectly synchronized to the GNSS through another UE (in or out of the network coverage) that is directly synchronized to the GNSS. When the GNSS is set to the synchronization source, the UE may calculate a direct frame number (DFN) and a subframe number based on coordinated universal time (UTC) and a (pre)configured DFN offset.

Alternatively, the UE may be directly synchronized to the BS or synchronized to another UE that is time/frequency synchronized to the BS. For example, if the UE is in the coverage of the network, the UE may receive synchronization information provided by the BS and be directly synchronized to the BS. Thereafter, the UE may provide the synchronization information to another adjacent UE. If the timing of the BS is set to the synchronization reference, the UE may follow a cell associated with a corresponding frequency (if the UE is in the cell coverage at the corresponding frequency) or follow a Pcell or serving cell (if the UE is out of the cell coverage at the corresponding frequency) for synchronization and DL measurement.

The serving cell (BS) may provide a synchronization configuration for carriers used in V2X sidelink communication. In this case, the UE may follow the synchronization configuration received from the BS. If the UE detects no cell from the carriers used in the V2X sidelink communication and receives no synchronization configuration from the serving cell, the UE may follow a predetermined synchronization configuration.

Alternatively, the UE may be synchronized to another UE that fails to directly or indirectly obtain the synchronization information from the BS or GNSS. The synchronization source and preference may be preconfigured for the UE or configured in a control message from the BS.

Hereinbelow, the SLSS and synchronization information will be described.

The SLSS may be a sidelink-specific sequence and include a primary sidelink synchronization signal (PSSS) and a secondary sidelink synchronization signal (SSSS).

Each SLSS may have a physical layer sidelink synchronization identity (ID), and the value may be, for example, any of 0 to 335. The synchronization source may be identified depending on which of the above values is used. For example, 0, 168, and 169 may indicate the GNSS, 1 to 167 may indicate the BS, and 170 to 335 may indicate out-of-coverage. Alternatively, among the values of the physical layer sidelink synchronization ID, 0 to 167 may be used by the network, and 168 to 335 may be used for the out-of-coverage state.

Figure 4:
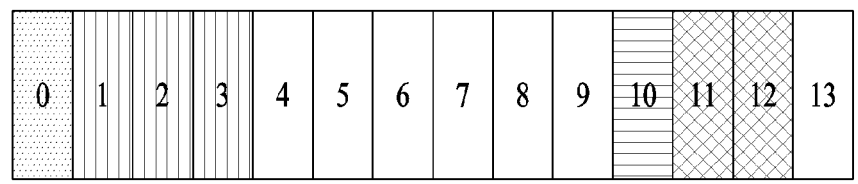
FIG. 4 illustrates a time resource unit for transmitting a sidelink synchronization signal.
Figure 4:
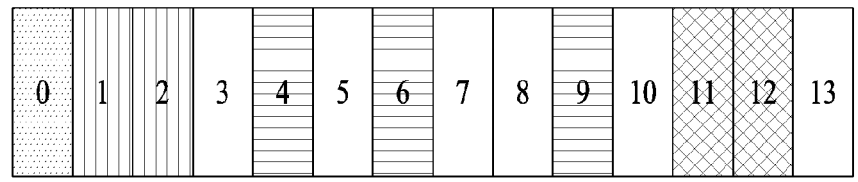
Figure 4:
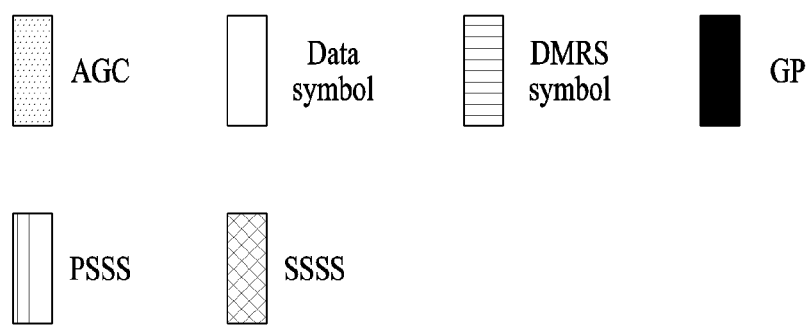

FIG. 4 illustrates a time resource unit for SLSS transmission. The time resource unit may be a subframe in LTE/LTE-A and a slot in 5G. The details may be found in 3GPP TS 36 series or 3GPP TS 28 series. A physical sidelink broadcast channel (PSBCH) may refer to a channel for carrying (broadcasting) basic (system) information that the UE needs to know before sidelink signal transmission and reception (e.g., SLSS-related information, a duplex mode (DM), a TDD UL/DL configuration, information about a resource pool, the type of an SLSS-related application, a subframe offset, broadcast information, etc.). The PSBCH and SLSS may be transmitted in the same time resource unit, or the PSBCH may be transmitted in a time resource unit after that in which the SLSS is transmitted. A DMRS may be used to demodulate the PSBCH.

Sidelink Transmission Mode

For sidelink communication, transmission modes 1, 2, 3 and 4 are used.

In transmission mode 1/3, the BS performs resource scheduling for UE 1 over a PDCCH (more specifically, DCI) and UE 1 performs D2D/V2X communication with UE 2 according to the corresponding resource scheduling. After transmitting sidelink control information (SCI) to UE 2 over a physical sidelink control channel (PSCCH), UE 1 may transmit data based on the SCI over a physical sidelink shared channel (PSSCH). Transmission modes 1 and 3 may be applied to D2D and V2X, respectively.

Transmission mode 2/4 may be a mode in which the UE performs autonomous scheduling (self-scheduling). Specifically, transmission mode 2 is applied to D2D. The UE may perform D2D operation by autonomously selecting a resource from a configured resource pool. Transmission mode 4 is applied to V2X. The UE may perform V2X operation by autonomously selecting a resource from a selection window through a sensing process. After transmitting the SCI to UE 2 over the PSCCH, UE 1 may transmit data based on the SCI over the PSSCH. Hereinafter, the term 'transmission mode' may be simply referred to as 'mode'.

Control information transmitted by a BS to a UE over a PDCCH may be referred to as DCI, whereas control information transmitted by a UE to another UE over a PSCCH may be referred to as SCI. The SCI may carry sidelink scheduling information. The SCI may have several formats, for example, SCI format 0 and SCI format 1.

SCI format 0 may be used for scheduling the PSSCH. SCI format 0 may include a frequency hopping flag (1 bit), a resource block allocation and hopping resource allocation field (the number of bits may vary depending on the number of sidelink RBs), a time resource pattern (7 bits), a modulation and coding scheme (MCS) (5 bits), a time advance indication (11 bits), a group destination ID (8 bits), etc.

SCI format 1 may be used for scheduling the PSSCH. SCI format 1 may include a priority (3 bits), a resource reservation (4 bits), the location of frequency resources for initial transmission and retransmission (the number of bits may vary depending on the number of sidelink subchannels), a time gap between initial transmission and retransmission (4 bits), an MCS (5 bits), a retransmission index (1 bit), a reserved information bit, etc. Hereinbelow, the term 'reserved information bit' may be simply referred to as 'reserved bit'. The reserved bit may be added until the bit size of SCI format 1 becomes 32 bits.

SCI format 0 may be used for transmission modes 1 and 2, and SCI format 1 may be used for transmission modes 3 and 4.

Sidelink Resource Pool

Figure 5:
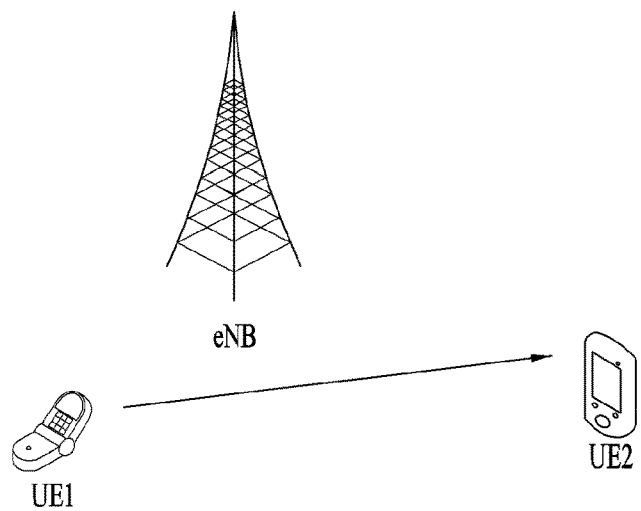
FIG. 5 is a view illustrating an exemplary resource pool for sidelink.
Figure 5:
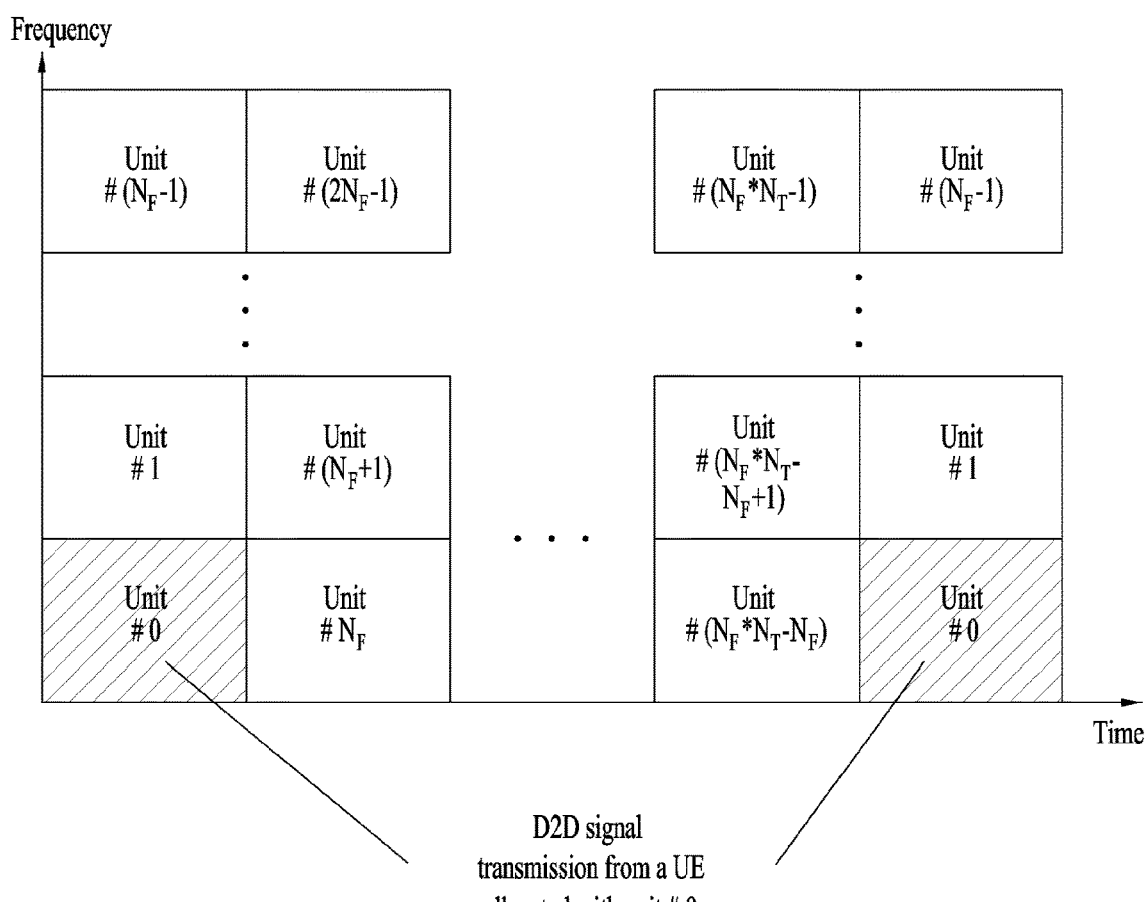

FIG. 5 shows an example of a first UE (UE1), a second UE (UE2) and a resource pool used by UE1 and UE2 performing sidelink communication.

Figure 8:
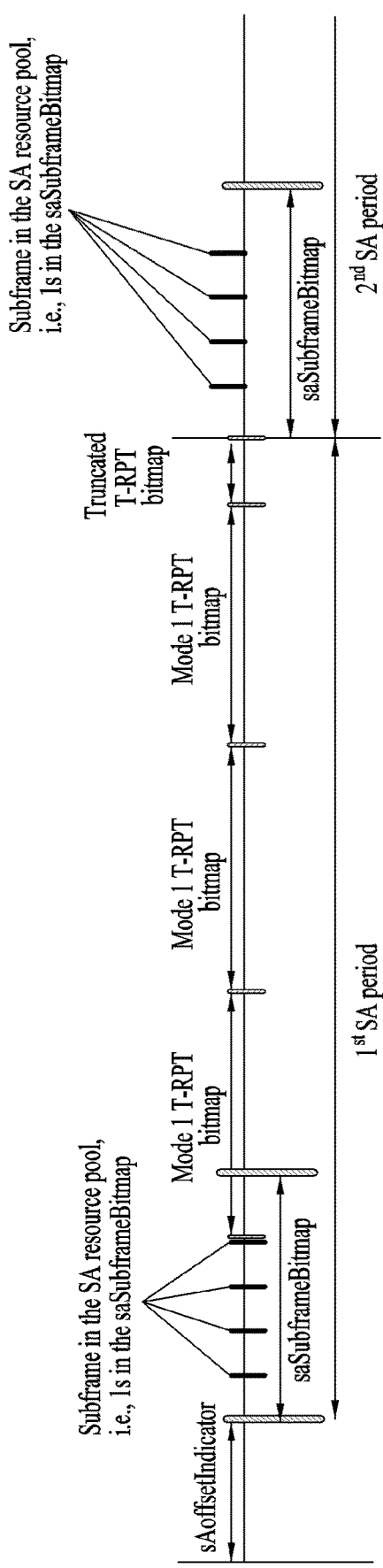
FIG. 8 illustrates transmission of a physical sidelink control channel (PSCCH).

In FIG. 5(*a*), a UE corresponds to a terminal or such a network device as a BS transmitting and receiving a signal according to a sidelink communication scheme. A UE selects a resource unit corresponding to a specific resource from a resource pool corresponding to a set of resources and the UE transmits a sidelink signal using the selected resource unit. UE2 corresponding to a receiving UE receives a configuration of a resource pool in which UE1 is able to transmit a signal and detects a signal of UE1 in the resource pool. In this case, if UE1 is located in the coverage of a BS, the BS may inform UE1 of the resource pool. If UE1 is located out of the coverage of the BS, the resource pool may be informed by a different UE or may be determined by a predetermined resource. In general, a resource pool includes a plurality of resource units. A UE selects one or more resource units from among a plurality of the resource units and may be able to use the selected resource unit(s) for sidelink signal transmission. FIG. 5(b) shows an example of configuring a resource unit. Referring to FIG. 8(b), the entire frequency resources are divided into the NF number of resource units and the entire time resources are divided into the NT number of resource units. In particular, it is able to define NF*NT number of resource units in total. In particular, a resource pool may be repeated with a period of NT subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a sidelink signal.

A resource pool may be classified into various types. First of all, the resource pool may be classified according to contents of a sidelink signal transmitted via each resource pool. For example, the contents of the sidelink signal may be classified into various signals and a separate resource pool may be configured according to each of the contents. The contents of the sidelink signal may include a scheduling assignment (SA or physical sidelink control channel (PSCCH)), a sidelink data channel, and a discovery channel. The SA may correspond to a signal including information on a resource position of a sidelink data channel, information on a modulation and coding scheme (MCS) necessary for modulating and demodulating a data channel, information on a MIMO transmission scheme, information on a timing advance (TA), and the like. The SA signal may be transmitted on an identical resource unit in a manner of being multiplexed with sidelink data. In this case, an SA resource pool may correspond to a pool of resources that an SA and sidelink data are transmitted in a manner of being multiplexed. The SA signal may also be referred to as a sidelink control channel or a physical sidelink control channel (PSCCH). The sidelink data channel (or, physical sidelink shared channel (PSSCH)) corresponds to a resource pool used by a transmitting UE to transmit user data. If an SA and a sidelink data are transmitted in a manner of being multiplexed in an identical resource unit, sidelink data channel except SA information may be transmitted only in a resource pool for the sidelink data channel. In other word, REs, which are used to transmit SA information in a specific resource unit of an SA resource pool, may also be used for transmitting sidelink data in a sidelink data channel resource pool. The discovery channel may correspond to a resource pool for a message that enables a neighboring UE to discover transmitting UE transmitting information such as ID of the UE, and the like.

Despite the same contents, sidelink signals may use different resource pools according to the transmission and reception properties of the sidelink signals. For example, despite the same sidelink data channels or the same discovery messages, they may be distinguished by different resource pools according to transmission timing determination schemes for the sidelink signals (e.g., whether a sidelink signal is transmitted at the reception time of a synchronization reference signal or at a time resulting from applying a predetermined TA to the reception time of the synchronization reference signal), resource allocation schemes for the sidelink signals (e.g., whether a BS configures the transmission resources of an individual signal for an individual transmitting UE or the individual transmitting UE autonomously selects the transmission resources of an individual signal in a pool), the signal formats of the sidelink signals (e.g., the number of symbols occupied by each sidelink signal in one subframe or the number of subframes used for transmission of a sidelink signal), signal strengths from the BS, the transmission power of a sidelink UE, and so on. In sidelink communication, a mode in which a BS directly indicates transmission resources to a sidelink transmitting UE is referred to as sidelink transmission mode 1, and a mode in which a transmission resource area is preconfigured or the BS configures a transmission resource area and the UE directly selects transmission resources is referred to as sidelink transmission mode 2. In sidelink discovery, a mode in which a BS directly indicates resources is referred to as Type 2, and a mode in which a UE selects transmission resources directly from a preconfigured resource area or a resource area indicated by the BS is referred to as Type 1.

In V2X, sidelink transmission mode 3 based on centralized scheduling and sidelink transmission mode 4 based on distributed scheduling are available.

Figure 6:
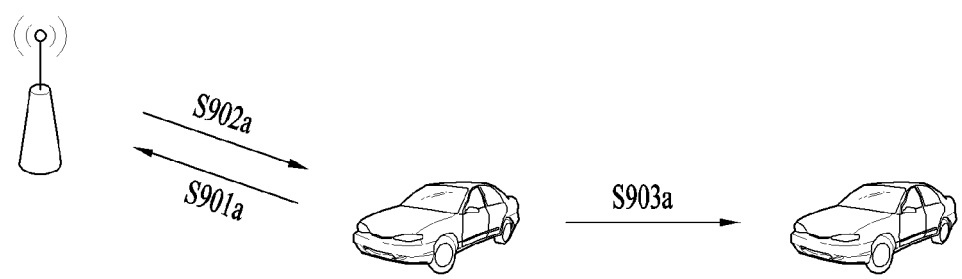
FIG. 6 is a view referred to for describing transmission modes and scheduling schemes for sidelink.
Figure 6:
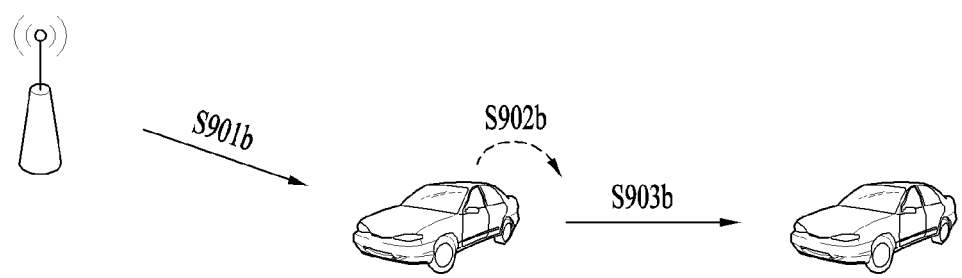

FIG. 6 illustrates scheduling schemes based on these two transmission modes. Referring to FIG. 6, in transmission mode 3 based on centralized scheduling of FIG. 6(a), a vehicle requests sidelink resources to a BS (S901a), and the BS allocates the resources (S902a). Then, the vehicle transmits a signal on the resources to another vehicle (S903a). In the centralized transmission, resources on another carrier may also be scheduled. In transmission mode 4 based on distributed scheduling of FIG. 6(b), a vehicle selects transmission resources (S902b) by sensing a resource pool, which is preconfigured by a BS (S901b). Then, the vehicle may transmit a signal on the selected resources to another vehicle (S903b).

Figure 7:
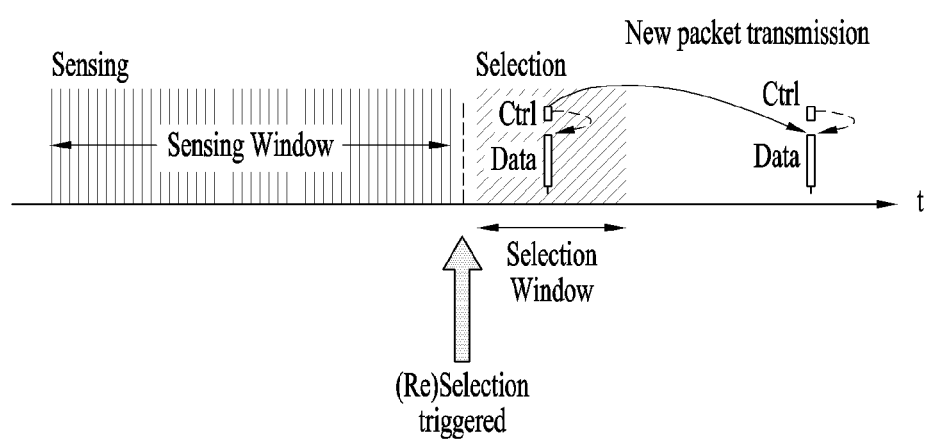
FIG. 7 is a view illustrating a method of selecting resources in sidelink.

When the transmission resources are selected, transmission resources for a next packet are also reserved as illustrated in FIG. 7. In V2X, transmission is performed twice for each MAC PDU. When resources for initial transmission are selected, resources for retransmission are also reserved with a predetermined time gap from the resources for the initial transmission. The UE may identify transmission resources reserved or used by other UEs through sensing in a sensing window, exclude the transmission resources from a selection window, and randomly select resources with less interference from among the remaining resources.

For example, the UE may decode a PSCCH including information about the cycle of reserved resources within the sensing window and measure PSSCH RSRP on periodic resources determined based on the PSCCH. The UE may exclude resources with PSCCH RSRP more than a threshold from the selection window. Thereafter, the UE may randomly select sidelink resources from the remaining resources in the selection window.

Alternatively, the UE may measure received signal strength indication (RSSI) for the periodic resources in the sensing window and identify resources with less interference, for example, the bottom 20 percent. After selecting resources included in the selection window from among the periodic resources, the UE may randomly select sidelink resources from among the resources included in the selection window. For example, when PSCCH decoding fails, the above method may be applied.

The details thereof may be found in clause 14 of 3GPP TS 3GPP TS 36.213 V14.6.0, which are incorporated herein by reference.

Transmission and Reception of PSCCH

In sidelink transmission mode 1, a UE may transmit a PSCCH (sidelink control signal, SCI, etc.) on a resource configured by a BS. In sidelink transmission mode 2, the BS may configure resources used for sidelink transmission for the UE, and the UE may transmit the PSCCH by selecting a time-frequency resource from among the configured resources.

FIG. 8 shows a PSCCH period defined for sidelink transmission mode 1 or 2.

Referring to FIG. 8, a first PSCCH (or SA) period may start in a time resource unit apart by a predetermined offset from a specific system frame, where the predetermined offset is indicated by higher layer signaling. Each PSCCH period may include a PSCCH resource pool and a time resource unit pool for sidelink data transmission. The PSCCH resource pool may include the first time resource unit in the PSCCH period to the last time resource unit among time resource units indicated as carrying a PSCCH by a time resource unit bitmap. In mode 1, since a time-resource pattern for transmission (T-RPT) or a time-resource pattern (TRP) is applied, the resource pool for sidelink data transmission may include time resource units used for actual transmission. As shown in the drawing, when the number of time resource units included in the PSCCH period except for the PSCCH resource pool is more than the number of T-RPT bits, the T-RPT may be applied repeatedly, and the last applied T-RPT may be truncated as many as the number of remaining time resource units. A transmitting UE performs transmission at a T-RPT position of 1 in a T-RPT bitmap, and transmission is performed four times in one MAC PDU.

Figure 9:
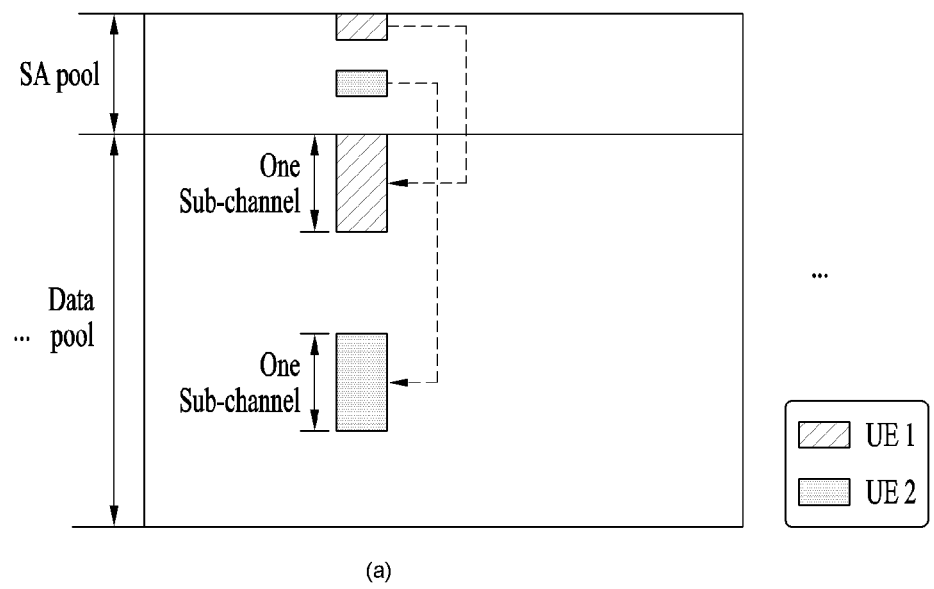
FIGS. 9(a) and 9(b) illustrate PSCCH transmission in sidelink vehicle-to-everything (V2X) communication.
Figure 9:
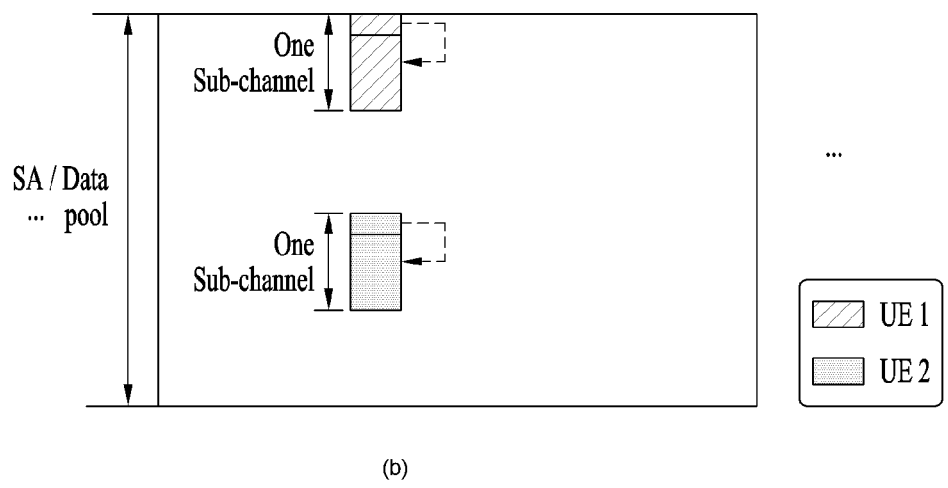

In V2X, that is, sidelink transmission mode 3 or 4, a PSCCH and data (PSSCH) are frequency division multiplexed (FDM) and transmitted, unlike sidelink communication. Since latency reduction is important in V2X in consideration of the nature of vehicle communication, the PSCCH and data are FDM and transmitted on the same time resources but different frequency resources. FIG. 9 illustrates examples of this transmission scheme. The PSCCH and data may not be contiguous to each other as illustrated in FIG. 9(*a*) or may be contiguous to each other as illustrated in FIG. 9(*b*). A subchannel is used as the basic unit for the transmission. The subchannel is a resource unit including one or more RBs in the frequency domain within a predetermined time resource (e.g., time resource unit). The number of RBs included in the subchannel, i.e., the size of the subchannel and the starting position of the subchannel in the frequency domain are indicated by higher layer signaling.

For V2V communication, a periodic type of cooperative awareness message (CAM) and an event-triggered type of decentralized environmental notification message (DENM) may be used. The CAM may include dynamic state information of a vehicle such as direction and speed, vehicle static data such as dimensions, and basic vehicle information such as ambient illumination states, path details, etc. The CAM may be 50 to 300 bytes long. In addition, the CAM is broadcast, and its latency should be less than 100 ms. The DENM may be generated upon occurrence of an unexpected incident such as a breakdown, an accident, etc. The DENM may be shorter than 3000 bytes, and it may be received by all vehicles within the transmission range. The DENM may have priority over the CAM. When it is said that messages are prioritized, it may mean that from the perspective of a UE, if there are a plurality of messages to be transmitted at the same time, a message with the highest priority is preferentially transmitted, or among the plurality of messages, the message with highest priority is transmitted earlier in time than other messages. From the perspective of multiple UEs, a high-priority message may be regarded to be less vulnerable to interference than a low-priority message, thereby reducing the probability of reception error. If security overhead is included in the CAM, the CAM may have a large message size compared to when there is no security overhead.

Sidelink Congestion Control

A sidelink radio communication environment may easily become congested according to increases in the density of vehicles, the amount of information transfer, etc. Various methods are applicable for congestion reduction. For example, distributed congestion control may be applied.

In the distributed congestion control, a UE understands the congestion level of a network and performs transmission control. In this case, the congestion control needs to be performed in consideration of the priorities of traffic (e.g., packets).

Specifically, each UE may measure a channel busy ratio (CBR) and then determine the maximum value ($CR_{limit_k}$) of a channel occupancy ratio ($CR_k$) that can be occupied by each traffic priority (e.g., k) according to the CBR. For example, the UE may calculate the maximum value ($CR_{limit_k}$) of the channel occupancy ratio for each traffic priority based on CBR measurement values and a predetermined table. If traffic has a higher priority, the maximum value of the channel occupancy ratio may increase.

The UE may perform the congestion control as follows. The UE may limit the sum of the channel occupancy ratios of traffic with a priority k such that the sum does not exceed a predetermined value, where k is less than i. According to this method, the channel occupancy ratios of traffic with low priorities are further restricted.

Besides, the UE may use methods such as control of the magnitude of transmission power, packet drop, determination of retransmission or non-retransmission, and control of the size of a transmission RB (MCS adjustment).

5G Use Cases

Three main requirement categories for 5G include (1) a category of enhanced mobile broadband (eMBB), (2) a category of massive machine type communication (mMTC), and (3) a category of ultra-reliable and low-latency communications (URLLC).

Partial use cases may require a plurality of categories for optimization and other use cases may focus upon only one key performance indicator (KPI). 5G supports such various use cases using a flexible and reliable method.

eMBB far surpasses basic mobile Internet access and covers abundant bidirectional work and media and entertainment applications in cloud and augmented reality. Data is one of a core driving force of 5G and, in the 5G era, a dedicated voice service may not be provided for the first time. In 5G, it is expected that voice will simply be processed as an application program using data connection provided by a communication system. Main causes for increased traffic volume are increase in the size of content and an increase in the number of applications requiring high data transmission rate. A streaming service (of audio and video), conversational video, and mobile Internet access will be more widely used as more devices are connected to the Internet. These application programs require always-on connectivity in order to push real-time information and alerts to users. Cloud storage and applications are rapidly increasing in a mobile communication platform and may be applied to both work and entertainment. Cloud storage is a special use case which accelerates growth of uplink data transmission rate. 5G is also used for cloud-based remote work. When a tactile interface is used, 5G demands much lower end-to-end latency to maintain good user experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential IoT devices will reach 20.4 billion up to the year of 2020. Industrial IoT is one of categories of performing a main role enabling a smart city, asset tracking, smart utilities, agriculture, and security infrastructure through 5G.

URLLC includes new services that will transform industries with ultra-reliable/available, low-latency links such as remote control of critical infrastructure and a self-driving vehicle. A level of reliability and latency is essential to control and adjust a smart grid, industrial automation, robotics, and a drone.

Next, a plurality of use cases will be described in more detail.

5G is a means of providing streaming at a few hundred megabits per second to gigabits per second and may complement fiber-to-the-home (FTTH) and cable-based broadband (or DOCSIS). Such high speed is needed to deliver TV at a resolution of 4K or more (6K, 8K, and more), as well as virtual reality and augmented reality. Virtual reality (VR) and augmented reality (AR) applications include immersive sports games. A specific application program may require a special network configuration. For example, for VR games, gaming companies need to incorporate a core server into an edge network server of a network operator in order to minimize latency.

Automotive is expected to be a new important driving force in 5G together with many use cases for mobile communication for vehicles. For example, entertainment for passengers requires high simultaneous capacity and mobile broadband with high mobility. This is because future users continue to expect high connection quality regardless of location and speed. Another automotive use case is an AR dashboard. The AR dashboard displays information talking to a driver about a distance to an object and movement of the object by being superimposed on an object seen from a front window to identify an object in the dark. In the future, a wireless module will enable communication between vehicles, information exchange between a vehicle and supporting infrastructure, and information exchange between a vehicle and other connected devices (e.g., devices transported by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by a human being.

A smart city and a smart home mentioned as a smart society will be embedded in a high-density wireless sensor network. A distributed network of an intelligent sensor will identify conditions for costs and energy-efficient maintenance of a city or a home. Similar configurations may be performed for respective households. All temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is highly decentralized so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of energy such as electricity by a method having efficiency, reliability, economic feasibility, sustainability of production, and automatability. The smart grid may also be regarded as another sensor network having low latency.

A health care part contains many application programs capable of enjoying the benefits of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in an industrial application field. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of cables and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Embodiments

The present disclosure provides a method for transmitting a feedback signal by a reception (Rx) UE in a wireless communication system.

The present disclosure provides a method for feeding back information about a time difference between frequency domains when a reception (Rx) UE transmits and receives a ranging signal (i.e., a signal for distance measurement) and a positioning signal in a plurality of frequency domains (e.g., band and/or carrier).

Further, the present disclosure provides a method for widening an effective bandwidth using multiple carriers for UE precise positioning, resulting in an increase in the accuracy of UE ranging.

Further, according to the embodiments of the present disclosure, when the distance between one UE and another UE is measured using multiple carriers, if a transmission (Tx) time delay between the UEs occurs, information of the transmission (Tx) time delay is signaled, so that the UE-to-UE distance can be more precisely measured.

In addition, the embodiments of the present disclosure need not always transmit and receive all signals to and from the actual wideband, and are designed to separately transmit and receive signals through bands spaced apart from each other by a predetermined frequency spacing or more, so that the UE-to-UE distance can be more precisely measured and RF signal latency can also be measured.

Measuring the distance between the UEs using RF signals (radio signals) may be the same as measuring a time delay (latency) of RF signals. The time delay of RF signals may be measured by correlation of known sequences in a time domain, or may be measured by measuring a phase difference between sinusoidal signals in a frequency domain. At this time, the latency measurement and the distance measurement (ranging) accuracy may be limited by a bandwidth of Tx signals.

If the UE is designed to always transmit the wideband signals for precise ranging and latency measurement, a UE battery lifespan may be shortened and the amount of used resources may unavoidably increase.

The present disclosure proposes a method for enabling the UE to transmit/receive narrowband signals distant from the UE, thereby implementing the ranging performance similar to that of transmission of wideband signals.

On the other hand, Phase Difference of Arrival (PDoA) may refer to a method for transmitting sinusoidal signals having different frequencies to the UE, so that the UE can perform ranging using a phase difference between the sinusoidal signals. Due to PDoA characteristics, if frequency spacing between different tones is considered large, the accuracy of UE ranging may increase. This is because the phase difference between sinusoidal signals distant from the frequency domain is greatly changed even to a very short latency.

The method for measuring a delay time (latency) through correlation of known sequences in the time domain may be affected a bandwidth and a sampling frequency of Tx signals. For example, when a signal is transmitted in a band of 20 MHz, a sampling frequency is set to 3.25*e^(−8) [sec] that is converted into a distance 9.76 meters. That is, the method for performing ranging (distance measurement) using time domain correlation at a signal of 20 MHz bandwidth has a ranging error of 9.76/2 meters on average. Here, the sampling frequency may represent how many times an analog signal is divided into digital signals for ADC (Analog-to-Digital Conversion) per second. That is, the sampling frequency may represent the number of sampling times for ADC.

When PDoA is used in a frequency domain, precise ranging can be performed without signal transmission of all frequency resources within a band. For example, the operation of transmitting a reference signal (RS) to each of a 2 GHz band and a 3 GHz band may have the same effect as configuration of a system having a 1 GHz bandwidth.

At this time, there is a possibility that signals are incorrectly transmitted at a desired time point within each band. For example, it may be difficult to implement timing synchronization for each frequency domain (e.g., band or carrier), or it may also be difficult to simultaneously transmit signals at a desired time point due to a listen before talk (LBT) operation of unlicensed band.

Figure 10:
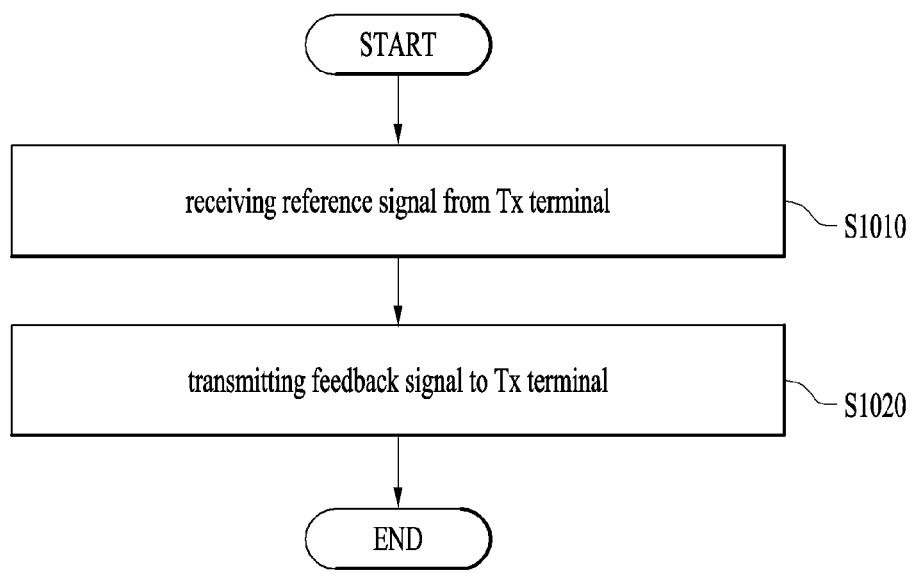
FIG. 10 is a flowchart illustrating operations of a method according to the embodiments of the present disclosure.

To this end, the embodiment of the present disclosure relates to a method for reducing an error when measuring the UE-to-UE distance using a plurality of carriers, and more particularly to a method for reducing a UE-to-UE ranging error by measuring a latency of RF signals, FIG. 10 is a flowchart illustrating operations of a method according to the embodiments of the present disclosure.

Referring to FIG. 10, the method for transmitting a feedback signal by a reception (Rx) UE in a wireless communication system may include receiving (S1010), by the Rx UE, a plurality of RSs (e.g., a first reference signal (RS) and a second RS) from a transmission (Tx) UE, and transmitting (S1020), by the Rx UE, a feedback signal to the Tx UE based on the plurality of RSs.

In this case, the feedback signal may include information about a time difference between a first FFT (fast Fourier transform) window for receiving the first RS, and a second FFT window for receiving the second RS. Also, the feedback signal may further include information about the first FFT window and information about the second FFT window. In an overhead aspect, it may be more efficient that only time difference information between the first FFT window and the second FFD window be included in the feedback signal.

In addition, the distance between the Tx UE and the Rx UE may be calculated based on a time difference between the first FFT window and the second FFT window. Further, the distance between the Tx UE and the Rx UE may also be calculated based on a time difference between Tx time points of the plurality of signals.

In the receiving step S1010, the Rx UE may receive the first RS through a first frequency domain, and may receive the second RS through a second frequency domain (different from the first frequency domain).

In addition, the method of FIG. 10 may further include acquiring, by the Rx UE, a phase difference between the first RS and the second RS, wherein the phase difference is caused by a first radio frequency (RF) chain receiving the first RS and a second RF chain receiving the second RS. In this case, the transmitting step S1020 may include transmitting the feedback signal including information of the phase difference to the Tx UE. In this case, the distance between the Tx UE and the Rx UE may also be calculated based on the phase difference information.

Figure 11:
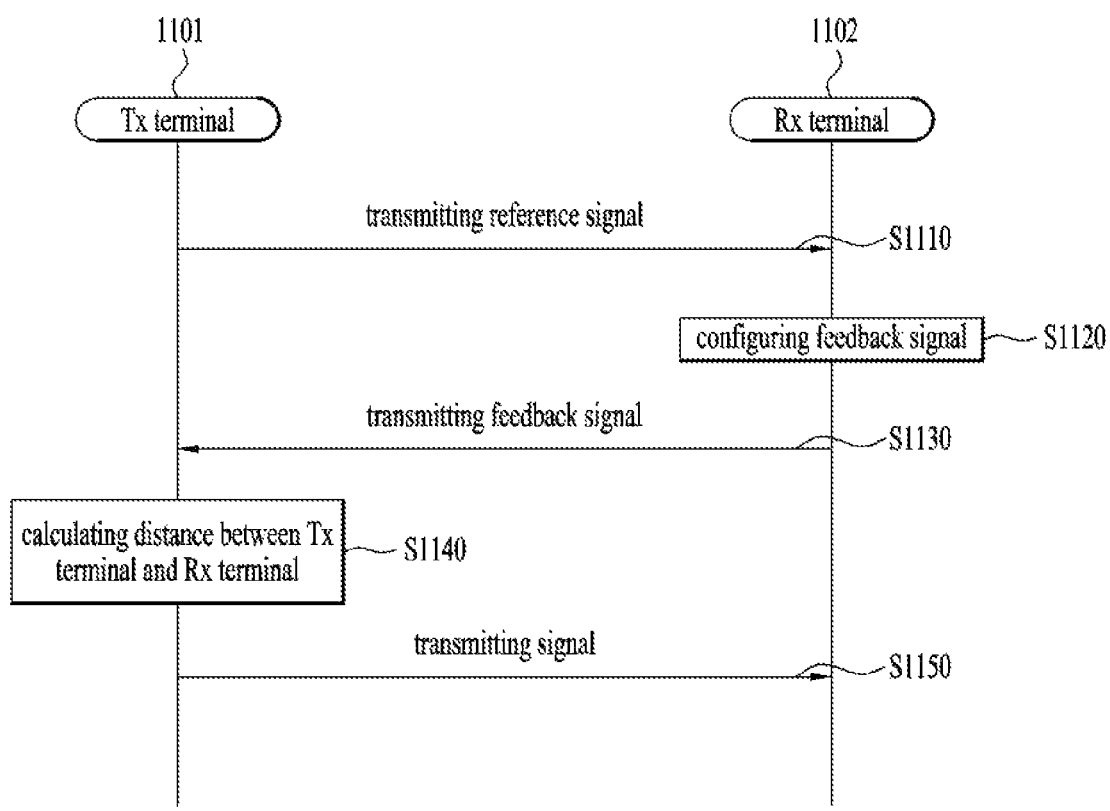
FIG. 11 is a conceptual diagram illustrating the method according to the present disclosure.

FIG. 11 is a conceptual diagram illustrating the method according to the present disclosure.

Referring to FIG. 11, a method for transmitting a feedback signal by the Rx UE 1102 in a wireless communication system may include transmitting g (S1110), by the Tx UE, a plurality of RSs (e.g., a first RS and a second RS) to the Tx UE; configuring (S1120), by the Rx UE 1102, a feedback signal based on the plurality of RSs (e.g., the first RS and the second RS); transmitting (S1130), by the Rx UE, the configured feedback signal to the Tx UE 1101; calculating (S1140), by the Tx UE, the distance between the Tx UE 1101 and the Tx UE 1102 based on the feedback signal; and transmitting (S1150), by the Tx UE 1101, signals to the Rx UE 1102 based on the calculated distance. Here, the Tx UE 1101 and/or the Rx UE 1102 may be a user equipment (UE), but may be a base station (BS) (e.g., eNB, gNB) for supporting LTE and/or NR communication. In addition, the feedback signal may include information about a time difference between the first FFT window for receiving the first RS and the second FFT window for receiving the second RS.

In addition, for example, the calculating step S1140 may include calculating, by the Tx UE 1101, the distance between the Tx UE 110 and the Rx UE 1102 based on a time difference between the first FFT window and the second FFT window. In addition, for example, the calculating step S1140 may further include calculating the distance between the Tx UE 1101 and the Rx UE 1102 based on a time difference between Tx time points where the first RS and the second RS are transmitted.

In another example, the method of FIG. 11 may further include calculating, based on a time difference between the first Rx time point where the Rx UE 1101 receives the first RS and the second Rx time point where the Rx UE 1101 receives the second RS, a time difference between the first Tx time point where the Tx UE transmits the first RS and the second Tx time point where the Tx UE transmits the second RS. In this case, the distance between the Tx UE 1101 and the Rx UE 1102 may be measured, calculated, and estimated based on a time difference between the first Tx time and the second Tx time.

In addition, in the method of FIG. 11, the feedback signal may further include information about a time difference between the first Tx time where the Rx UE 1102 receives the first RS and the second Rx time where the Rx UE 1102 receives the second RS.

In addition, the method of FIG. 11 may further transmitting, by the Rx UE 1102, at least one of first time difference information (i) and second time difference information (ii), and estimating/measuring/calculating, by the Tx UE 1101, the distance between the Tx UE 1101 and the Rx UE 1102 based on at least one of the first time difference information (i) and the second time difference information (ii). Here, the first time difference information (i) may refer to information about a time difference between the third Tx time point where the Rx UE 1102 transmits a first feedback signal and the first Rx time point where the Rx UE 1102 receives the first RS, and the second time difference information (ii) may refer to information about a time difference between the fourth Tx time point where the Rx UE 1102 transmits a second feedback signal and the second Tx time point where the Rx UE 1102 receives the second RS.

On the other hand, the Tx UE may transmit a (predetermined) positioning reference signal (PRS), a ranging reference signal, and/or (predetermined) another reference signal in different frequency domains (e.g., Band 0 and Band 1 of FIGS. 12 and 13) and different component carriers. Here, the Tx UE may refer to not only a mobile UE such as a UE, but also a fixed network entity such as a BS. Although the following description is given based on the PRS for convenience of description, other implementations are also possible. Here, the reference signal (RS) may refer to a reference signal (RS) for positioning or a reference signal (RS) for ranging. Information indicating whether to transmit the positioning RS (e.g., PRS) in a combination of any frequency domains (e.g., band or carrier) may be (pre-)signaled from the Tx UE to the Rx UE through physical layer signaling or higher layer signaling. Here, a component carrier (CC) may refer to a unit carrier used for bandwidth extension.

Figure 12:
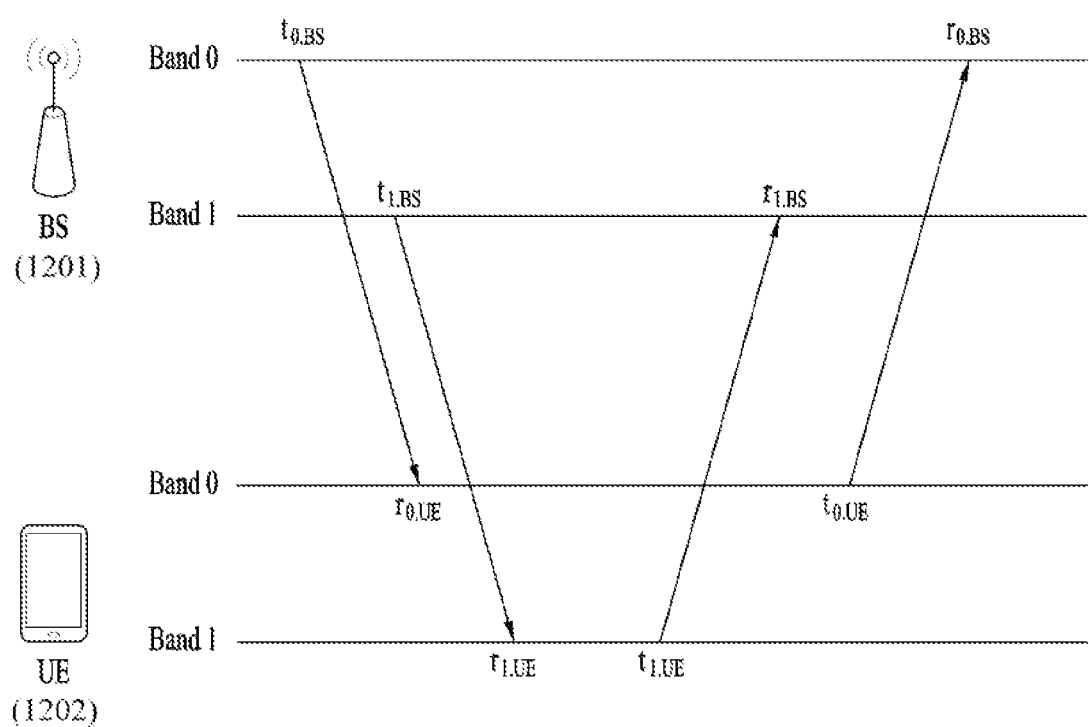
FIG. 12 is a conceptual diagram illustrating the method according to the present disclosure.

The Rx UE may measure a time difference between Tx time points of frequency domains using a time difference (or a phase difference) between Rx time points of reference signals (RSs) (e.g., PRS) received at different frequency domains. In FIG. 12, the Rx UE (e.g., UE 1202 of FIG. 12) may calculate a time difference between frequency domains as represented by the following equation 1. In FIG. 12, the receiving terminal (eg, UE specification 1202 of FIG. 12) may calculate the time difference between the frequency regions of Equation (1) below.

$$t_{1,Rx} - t_{0,Rx} = t_{1,Tx} - t_{0,Tx}$$ [Equation 1]

In Equation 1, $t_{1,RX}$ may be a time point where the Rx UE receives a signal in a first frequency domain (e.g., Band 0), $t_{0,RX}$ may be a time point where the Tx UE receives a signal in a second frequency domain (e.g., Band 1), and $t_{0,TX}$ may be a time point where the Tx UE receives a signal in the first frequency domain (e.g., Band 0).

However, if the Rx UE (e.g., UE 1202 of FIG. 12) receives a signal using a separate RF chain and a separate FFT window in each frequency domain (e.g., band or carrier), correction caused by a difference between Rx FFT windows of the respective frequency domains may be required. In addition, the Rx UE may discriminate between a difference caused by different RF chains of the respective frequency domains (e.g., band or carrier) and a difference caused by different Rx FFT windows of the respective frequency domains, and then consider the discriminated result.

Figure 13:
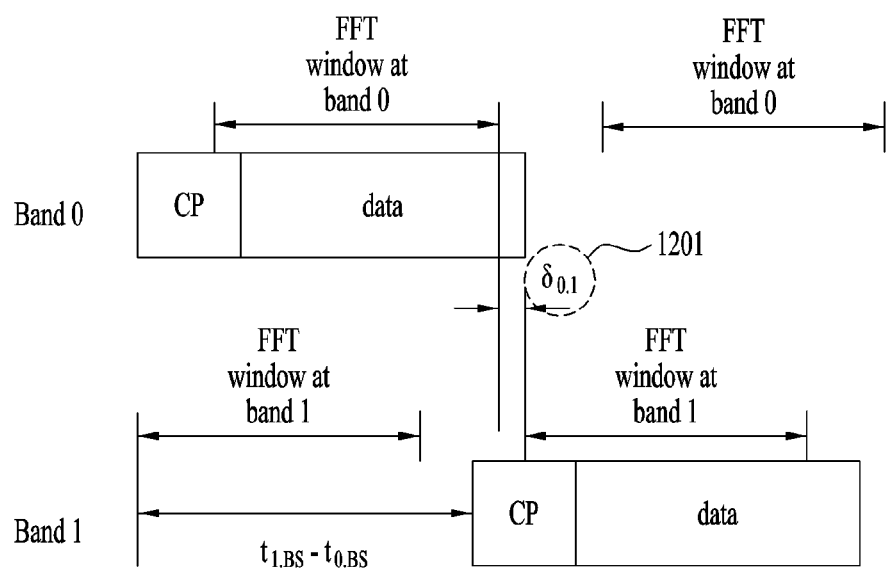
FIG. 13 is a conceptual diagram illustrating the method according to the present disclosure.

FIG. 13 illustrates an exemplary case in which Rx FFT windows of the Rx UE are different from each other between the frequency domains. If the Rx UE independently applies the FFT window to each frequency domain in a different way from a Tx time point where the Tx UE performs signal transmission for each frequency domain, a ranging error may occur by a time difference caused by application of different FFT windows.

The Rx UE may signal information about a time difference between FFT windows of the respective frequency domains to the Tx UE through physical layer signaling or higher layer signaling. For example, the transmitting step S1020 of FIG. 10 may include transmitting, to the Tx UE, a feedback signal including information about the first FFT window for receiving the first RS and information about the second FFT window for receiving the second RS. As a result, the distance between the Tx UE and the Rx UE may be calculated (by the Tx UE) based on information about the first FFT window and information about the second FFT window. In another example, the transmitting step S1020 of FIG. 10 may include transmitting, to the Tx UE, a feedback signal including information about a time difference between the first FFT window for receiving the first RS and the second FFT window for receiving the second RS. Here, the distance between the Tx UE and the Rx UE may be calculated (by the Tx UE) based on a time difference between the first FFT window and the second FFT window. In FIG. 13, $\delta_{0,1}$ may denote information about a time difference between FFT windows of the respective frequency domains. If information about a time difference between two different frequency domains corresponds to at least an integer multiple of a symbol length used in two different frequency domains, the time difference information may further include information indicating the sum of $\delta_{0,1}$ and the integer multiple of the symbol length.

In accordance with one embodiment of the present disclosure, it is assumed that the Tx UE has already recognized a difference in Tx time (as a known Tx time difference) between the respective frequency domains. At this time, if the Rx UE determines that there is a time difference between Rx FFT windows for each frequency domain, this means that the Rx UE has interpreted the Tx time difference differently from the known Tx time difference, so that information about the interpreted Tx time difference can be additionally fed back to the Rx UE.

It can be assumed that the position of the FFT window in each frequency domain is maintained for a predetermined time.

The Rx UE may signal a time difference between a signal reception (Rx) time point and a signal transmission (Tx)

time point in each frequency domain to the Tx UE through physical layer signaling or higher layer signaling. In this case, information about a time difference for each frequency domain can be separately signaled, but one of two frequency domains may be selected so that information a time difference between Tx and Rx time points in the selected frequency domain may be fed back to the Tx UE. If one of two frequency domains is selected and a time difference between Tx and Rx time points is then fed back, the amount of signaling overhead can be cut in half. However, in this case, it should be assumed that a time difference (e.g., FFT window difference) between Rx time points of the respective frequency domains is maintained even in a signal transmission mode. For example, the receiving step S1010 of FIG. 10 may include receiving, by the Rx UE, at least one of the first Tx time point where the Tx UE transmits the first RS and the second Tx time point where the Tx UE transmits the second RS, from the Tx UE. The transmitting step S1020 of FIG. 10 may include transmitting, by the Rx UE, at least one of first information indicating a time difference between the first Tx time and the first Rx time and second information indicating a time difference between the second Tx time and the second Rx time, to the Tx UE. Here, the distance between the Tx UE and the Rx UE may be calculated based on at least one of the first information and the second information.

When the Rx UE transmits a feedback signal, the Rx UE may feed back information about a Tx time difference between the frequency domains to the Rx UE through physical layer signaling or higher layer signaling. When the Rx UE transmits a feedback signal in each frequency domain, the above-mentioned Tx time difference information may be included in a signal to be transmitted later.

If the Rx UE uses a separate RF chain for each frequency domain and if there is a change in phase due to a difference in RF chain between the frequency domains, information about the above difference value and/or an offset value can be fed back to the Tx UE through physical layer signaling or higher layer signaling.

The above information corresponds to a (unique) phase difference caused by a difference between RF chains, is UE-self-measured by UE implementation, and is then fed back. Alternatively, when a difference between FFT windows of the frequency domains is fed back, the above information may be considered to be an offset value and may then be fed back to serve as one combined information. That is, when the Rx UE feeds back a difference between Rx time points of the frequency domains, the Rx UE considers a difference caused by Rx circuit implementation, and then feeds back the final calculated value to the Tx UE. For example, the method according to one embodiment of the present disclosure may further include acquiring, by the Rx UE, a phase difference between the first RS and the second RSs caused by a first RF chain for receiving the first RS and a second RF chain for receiving the second RS. The transmitting step S1020 of FIG. 10 may include transmitting, by the Rx UE, the feedback signal including information indicating the phase difference to the Tx UE. In addition, the distance between the Tx UE and the Rx UE may be calculated based on information indicating the phase difference.

The Tx UE may measure the distance between the Tx UE and the Rx UE based on feedback information received from the Rx UE.

One embodiment of the present disclosure can be described again as follows.

A first UE (BS or mobile UE) may transmit a predetermined positioning reference signal (PRS), a ranging reference signal, or a predetermined RS in different bands (e.g., Band 0 and Band 1) or in different component carriers (CCs). In the following description, different frequency bands will hereinafter be referred to as Band or Carrier. For convenience of description, the RS for positioning or ranging will hereinafter be referred to as PRS. Information about which band combination or which carrier combination will be used for PRS transmission can be pre-signaled from the first UE to the second UE through physical layer signaling or higher layer signaling. In some bands, the transmission of the PRS in a carrier combination may be signaled to the second terminal from the first terminal with a physical layer or an upper layer signal.

The second UE may measure a difference in Tx time between bands using a phase difference between PRSs received in different bands or using a difference in Rx time between bands received in different bands. In FIG. 12, the second UE (e.g., UE) may calculate a time difference between carriers or a time difference between bands as represented by the following equation 2.

$$r_{1,UE} - r_{0,UE} = t_{1,BS} - t_{0,BS} \quad \text{[Equation 2]}$$

In Equation 2, $r_{1,UE}$ may denote a Rx time point where the UE receives a signal in Band 1, $r_{0,UE}$ may denote a Rx time point where the UE receives a signal in Band 0, $t_{1,BS}$ may denote a Tx time point where the BS transmits a signal in Band 1, and $t_{0,BS}$ may denote a Tx time point where the BS receives a signal in Band 0.

However, if the second UE (e.g., UE 1202 of FIG. 12) receives signals using a separate RF chain and a separate FFT window in each band, correction caused by a difference in Rx FFT window between the bands may be required.

FIG. 13 illustrates an exemplary case in which Rx FFT windows received by the second UE are different from each other between bands. Separately from a time difference between signal transmission (Tx) time points where the Tx UE performs signal transmission for each band, if the Rx UE independently applies the FFT window to each band, the ranging (distance measurement) error corresponding to the time difference may occur.

The second UE may signal information about a time difference between FFT windows of the respective bands to the first UE through physical layer signaling or higher layer signaling. In FIG. 13, $\delta_{0,1}$ may denote information about a time difference between FFT windows of the respective frequency domains. If information about a time difference between two different frequency domains corresponds to at least an integer multiple of a symbol length used in two different frequency domains, the time difference information may further include information indicating the sum of $\delta_{0,1}$ and the integer multiple of the symbol length.

In accordance with one embodiment of the present disclosure, it is assumed that the first UE has already recognized a difference in Tx time (as a known Tx time difference) between the respective bands. At this time, if the second UE determines that there is a time difference between Rx FFT windows for each band, this means that the UE has interpreted the Tx time difference differently from the known Tx time difference, so that information about the interpreted Tx time difference can be additionally fed back to the first UE.

It can be assumed that the position of the FFT window in each band is maintained for a predetermined time.

The second UE may signal a time difference between a signal reception (Rx) time point and a signal transmission (Tx) time point in each band to the Tx UE through physical layer signaling or higher layer signaling. In this case, information about a time difference for each band can be separately signaled, but one of two bands may be selected so that information a time difference between Tx and Rx time points in the selected band may be fed back. In the latter case, the amount of signaling overhead can be cut in half. However, in this case, it should be assumed that a time difference (e.g., FFT window difference) between Rx time points of the respective bands is maintained even in a signal transmission mode.

When the second UE transmits a feedback signal, the second UE may feed back information about a Tx time difference between the bands to the Tx UE through physical layer signaling or higher layer signaling. When the second UE transmits a feedback signal in each band, the above-mentioned Tx time difference information may be included in a signal to be transmitted later.

If the second UE uses a separate RF chain for each frequency domain and if there is a change in phase due to a difference in RF chain between the bands, information about the above difference value and/or an offset value can be fed back to the first UE through physical layer signaling or higher layer signaling.

The above information corresponds to a unique phase difference caused by a difference between RF chains, is UE-self-measured by UE implementation, and is then fed back. Alternatively, when a difference between FFT windows of the bands is fed back, the above information may be considered to be an offset value and may then be fed back to serve as one combined information. That is, when the Rx UE feeds back a difference between Rx time points of the bands, the second UE considers a difference caused by Rx circuit implementation, and then feeds back the final calculated value to the first UE.

The first UE may measure the distance between the first UE and the second UE based on feedback information received from the second UE.

Example of Communication System to which the Present Disclosure is Applied

Various descriptions, functions, procedures, proposals, methods and/or operational flowcharts of the present disclosure disclosed in this document are applicable, but limited, to various fields requiring wireless communication/connection (e.g., 5G) between devices.

Hereinafter, examples will be illustrated in more detail with reference to the drawings. In the following drawings/description, the same reference numerals may exemplify the same or corresponding hardware blocks, software blocks, or functional blocks, unless otherwise indicated.

Figure 14:
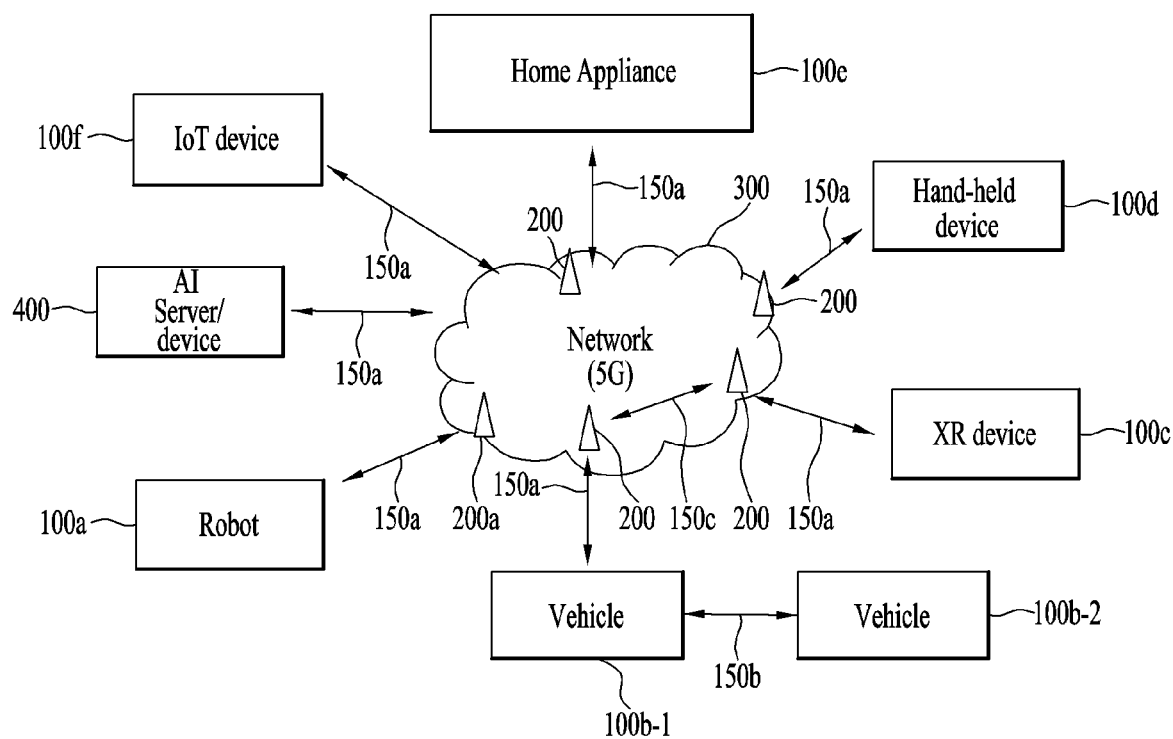
FIG. 14 is a diagram illustrating a communication system to which one embodiment of the present disclosure can be applied.

FIG. 14 illustrates a communication system 1 applied to the present disclosure. Referring to FIG. 14, a communication system 1 applied to the present disclosure includes wireless devices, BSs, and a network. Herein, the wireless devices represent devices performing communication using RAT (e.g., 5G NR or LTE) and may be referred to as communication/radio/5G devices. The wireless devices may include, without being limited to, a robot 100a, vehicles 100b-1 and 100b-2, an extended reality (XR) device 100c, a hand-held device 100d, a home appliance 100e, an Internet of things (IoT) device 100f, and an artificial intelligence (AI) device/server 400. For example, the vehicles may include a vehicle having a wireless communication function, an autonomous driving vehicle, and a vehicle capable of performing communication between vehicles. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. V2V/V2X communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as UL/DL communication 150a, sidelink communication 150b (or, D2D communication), or inter BS communication (e.g. relay, integrated access backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Examples of wireless devices applicable to the present disclosure

Figure 15:
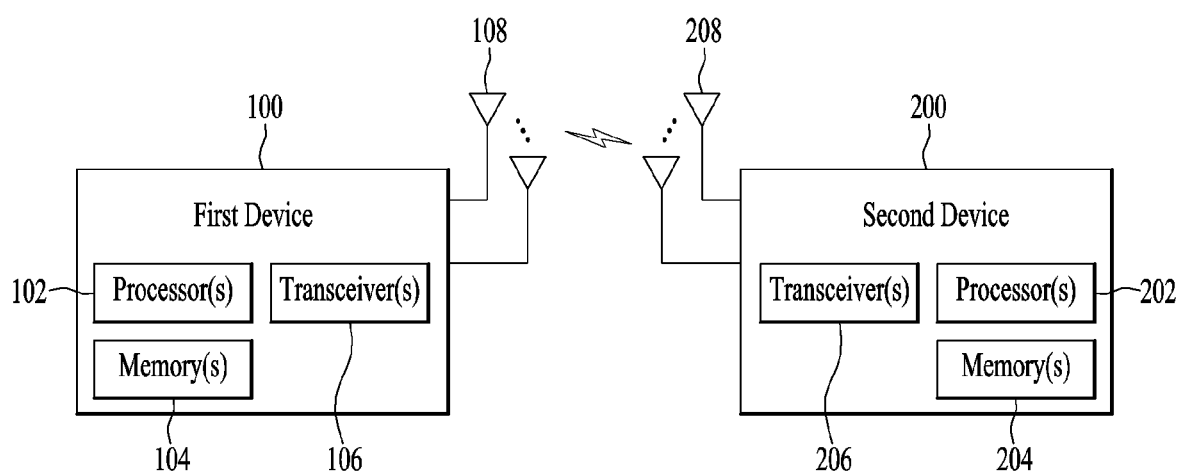
FIG. 15 is a block diagram illustrating a wireless device to which one embodiment of the present disclosure can be applied.

FIG. 15 illustrates wireless devices applicable to the present disclosure.

Referring to FIG. 15, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 14.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor 102 may be configured to implement at least one operation of the above-mentioned methods. For example, the processor 102 may control the transceiver 106 to receive the first RS and the second RS from the second wireless device 200, and may control the transceiver 106 to transmit the feedback signal to the second wireless device 200 based on the first RS and the second RS. The feedback signal may correspond to a distance between the second wireless device 200 and the first wireless device 100, wherein the distance includes information about a time difference between the first FFT window for receiving the first RS and the second FFT window for receiving the second RS. In this case, the distance between the second wireless device 200 and the first wireless device 100 may be calculated based on a time difference between the first FFT window and the second FFT window.

The processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more service data unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 16:
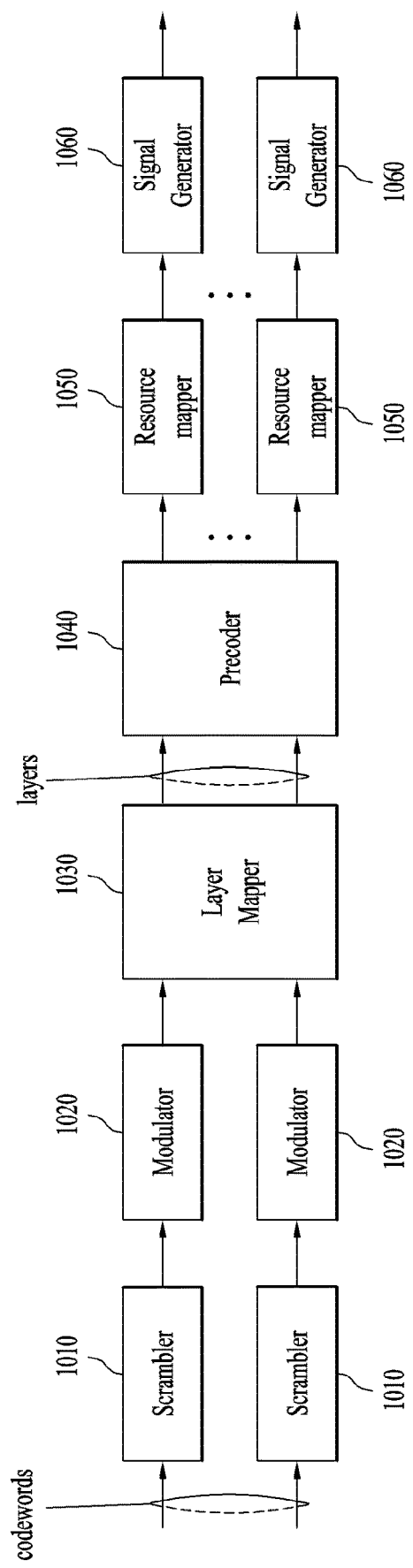
FIG. 16 is a block diagram illustrating a signal processing circuit for transmission (Tx) signals to which one embodiment of the present disclosure can be applied.

Examples of Signal Processing Circuit to which the Present Disclosure is Applicable FIG. 16 illustrates a signal process circuit for a transmission signal.

Referring to FIG. 16, a signal processing circuit 1000 may include scramblers 1010, modulators 1020, a layer mapper 1030, a precoder 1040, resource mappers 1050, and signal generators 1060. An operation/function of FIG. 16 may be performed, without being limited to, the processors 102 and 202 and/or the transceivers 106 and 206 of FIG. 15. Hardware elements of FIG. 16 may be implemented by the processors 102 and 202 and/or the transceivers 106 and 206 of FIG. 15. For example, blocks 1010 to 1060 may be implemented by the processors 102 and 202 of FIG. 15. Alternatively, the blocks 1010 to 1050 may be implemented by the processors 102 and 202 of FIG. 15 and the block 1060 may be implemented by the transceivers 106 and 206 of FIG. 15.

Codewords may be converted into radio signals via the signal processing circuit 1000 of FIG. 16. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include IFFT modules, CP inserters, digital-to-analog converters (DACs), and frequency up-converters.

Signal processing procedures for a signal received in the wireless device may be configured in a reverse manner of the signal processing procedures 1010 to 1060 of FIG. 16. For example, the wireless devices (e.g., 100 and 200 of FIG. 15) may receive radio signals from the exterior through the antenna ports/transceivers. The received radio signals may be converted into baseband signals through signal restorers. To this end, the signal restorers may include frequency DL converters, analog-to-digital converters (ADCs), CP remover, and FFT modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Use Cases of Wireless Devices to which the Present Disclosure is Applied

Figure 17:
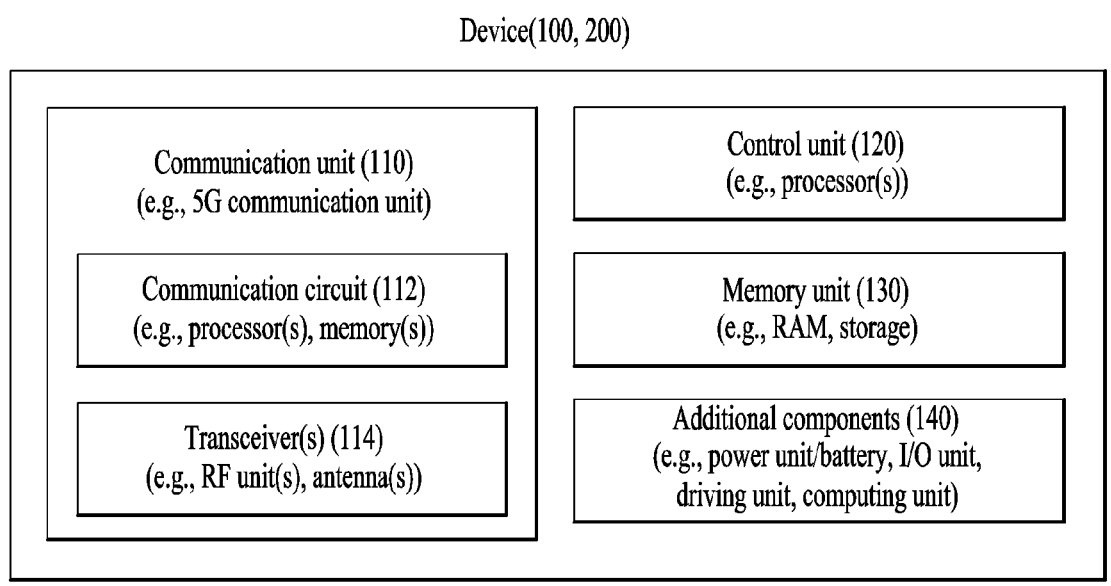
FIG. 17 is a block diagram illustrating a wireless device to which another embodiment of the present disclosure can be applied.

FIG. 17 is a block diagram illustrating a wireless device to which another embodiment of the present disclosure can be applied. The wireless device may be implemented in various forms according to a use case/service (refer to FIGS. 14, 18, 19 and 20).

Referring to FIG. 17, wireless devices 100 and 200 may correspond to the wireless devices 100 and 200 of FIG. 15 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 15. For example, the transceiver(s) 114 may include the one or more transceivers 106 and 206 and/or the one or more antennas 108 and 208 of FIG. 15. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110. For example, the controller 120 may be configured to implement at least one operation of the above-mentioned methods. For example, the controller 120 may control the communication unit 110 to receive the first RS and the second RS from the other wireless device 200, and may control the communication unit 110 to transmit the feedback signal to the other wireless device 200 based on the first RS and the second RS. The feedback signal may correspond to a distance between the other wireless device 200 and the first wireless device 100, wherein the distance includes information about a time difference between the first FFT window for receiving the first RS and the second FFT window for receiving the second RS. In this case, the distance between the other wireless device 200 and the first wireless device 100 may be calculated based on a time difference between the first FFT window and the second FFT window.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 14), the vehicles (100b-1 and 100b-2 of FIG. 14), the XR device (100c of FIG. 14), the hand-held device (100d of FIG. 14), the home appliance (100e of FIG. 14), the IoT device (100f of FIG. 14), a digital broadcast terminal, a hologram device, a public safety device, an MTC device, a medicine device, a FinTech device (or a finance device), a security device, a climate/environment device, the AI server/device (400 of FIG. 14), the BSs (200 of FIG. 14), a network node, etc. The wireless device may be used in a mobile or fixed place according to a use-example/service.

In FIG. 17, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Hereinafter, an example of implementing FIG. 17 will be described in detail with reference to the drawings.

Examples of a hand-held device applicable to the present disclosure

Figure 18:
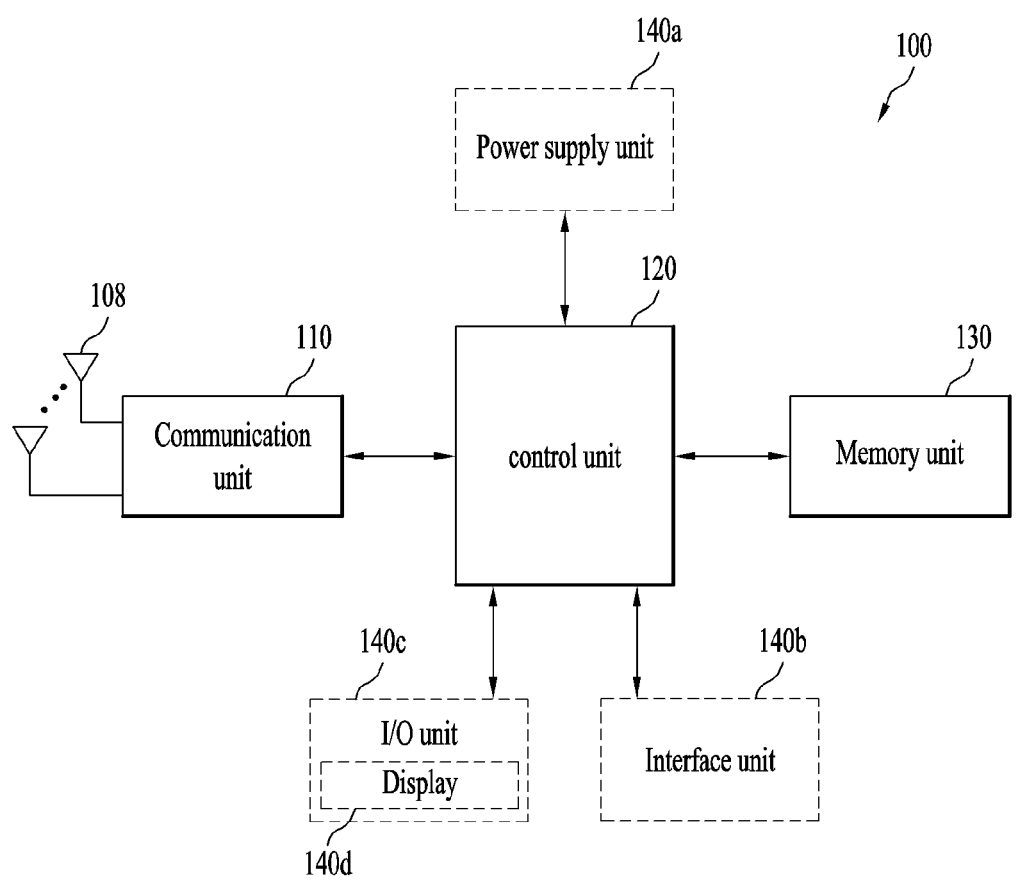
FIG. 18 is a block diagram illustrating a hand-held device to which another embodiment of the present disclosure can be applied.

FIG. 18 illustrates a hand-held device applied to the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 18, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 17, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an application processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 19:
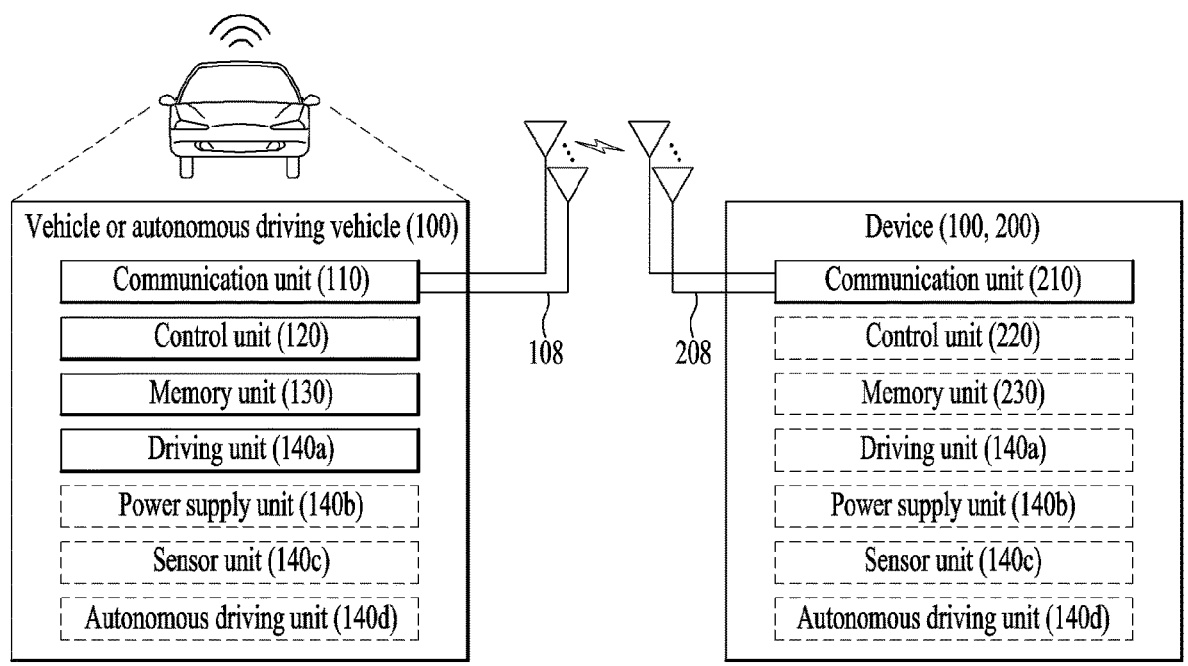
FIG. 19 is a block diagram illustrating a vehicle or an autonomous driving vehicle to which another embodiment of the present disclosure can be applied.

Examples of a vehicle or an autonomous driving vehicle applicable to the present disclosure FIG. 19 illustrates a vehicle or an autonomous driving vehicle applied to the present disclosure. The vehicle or autonomous driving vehicle may be implemented by a mobile robot, a car, a train, a manned/unmanned aerial vehicle (AV), a ship, etc.

Referring to FIG. 19, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 17, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. For example, the controller 120 may be configured to implement at least one operation of the above-mentioned methods. For example, the controller 120 may control the communication unit 110 to receive the first RS and the second RS from the other vehicle or an autonomous driving vehicle 200, and may control the communication unit 110 to transmit the feedback signal to the other vehicle or autonomous driving vehicle 200 based on the first RS and the second RS. The feedback signal may correspond to a distance between the other vehicle or autonomous driving vehicle 200 and the vehicle or autonomous driving vehicle 200, wherein the distance includes information about a time difference between the first FFT window for receiving the first RS and the second FFT window for receiving the second RS. At this time, the distance can be calculated based on a time difference between the first FFT window and the second FFT window.

The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Examples of a vehicle and AR/VR applicable to the present disclosure

Figure 20:
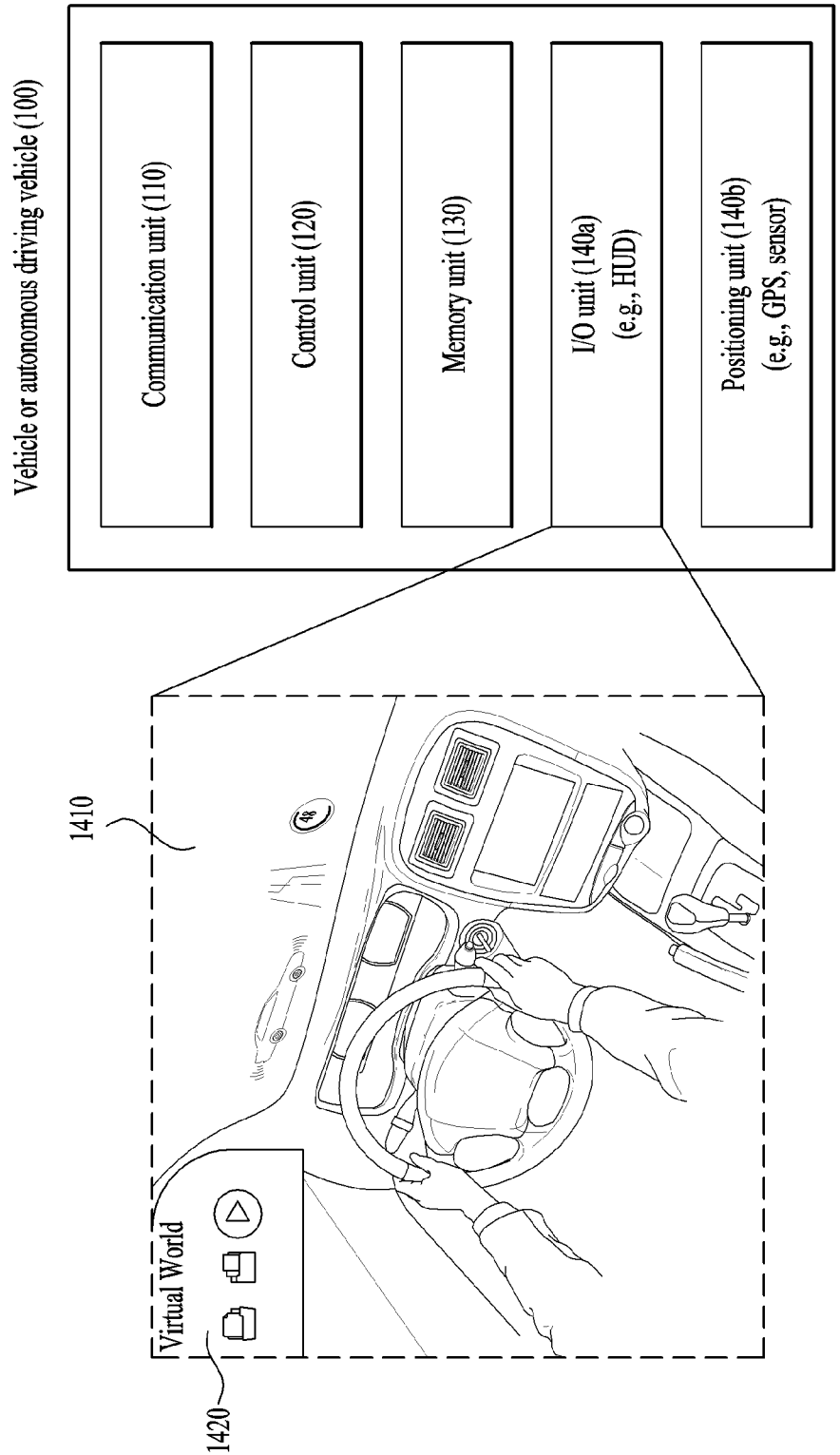
FIG. 20 is a block diagram illustrating a vehicle to which another embodiment of the present disclosure can be applied.

FIG. 20 illustrates a vehicle applied to the present disclosure. The vehicle may be implemented as a transport means, an aerial vehicle, a ship, etc.

Referring to FIG. 20, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 17.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this document, embodiments of the present disclosure have been described mainly based on a signal transmission/reception relationship between a terminal and a base station. Such a transmission/reception relationship is applied to signal transmission/reception between a terminal and a relay or between a base station and a relay in in the same/similar manner. In some cases, a specific operation described in this document as being performed by the base station may be performed by an upper node thereof. That is, it is apparent that various operations performed for communication with a terminal in a network including a plurality of network nodes including a base station may be performed by the base station or network nodes other than the base station. The base station may be replaced with terms such as fixed station, Node B, eNode B (eNB), gNode B (gNB), access point, or the like. In addition, the terminal may be replaced with terms such as User Equipment (UE), Mobile Station (MS), Mobile Subscriber Station (MSS), or the like.

The examples of the present disclosure may be implemented through various means. For example, the examples may be implemented by hardware, firmware, software, or a combination thereof. When implemented by hardware, an example of the present disclosure may be implemented by one or more application specific integrated circuits (ASICs), one or more digital signal processors (DSPs), one or more digital signal processing devices (DSPDs), one or more programmable logic devices (PLDs), one or more field programmable gate arrays (FPGAs), one or more processors, one or more controllers, one or more microcontrollers, one or more microprocessor, or the like.

When implemented by firmware or software, an example of the present disclosure may be implemented in the form of a module, a procedure, or a function that performs the functions or operations described above. Software code may be stored in a memory unit and executed by a processor. The memory unit may be located inside or outside the processor, and may exchange data with the processor by various known means.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-mentioned embodiments of the present disclosure are applicable to various mobile communication systems.

The invention claimed is:

1. A method for transmitting a feedback signal by a reception user equipment (UE) in a wireless communication system comprising:
   receiving, by the reception user equipment (UE), a first reference signal and a second reference signal from a transmission user equipment (UE); and
   transmitting, by the reception user equipment (UE), the feedback signal to the transmission user equipment (UE) based on the first reference signal and the second reference signal,
   wherein
      the feedback signal includes information about a time difference between a first FFT (Fast Fourier Transform) window for receiving the first reference signal and a second FFT window for receiving the second reference signal; and
      a distance between the transmission user equipment (UE) and the reception user equipment (UE) is calculated based on a time difference between the first FFT window and the second FFT window.

2. The method according to claim 1, wherein the receiving includes:
   receiving the first reference signal through a first frequency domain; and
   receiving the second reference signal through a second frequency domain different from the first frequency domain.

3. The method according to claim 1, wherein:
   the feedback signal further includes information about the first FFT window and information about the second FFT window.

4. The method according to claim 1, further comprising:
   acquiring, by the reception user equipment (UE), a phase difference between the first reference signal and the second reference signal, the phase difference being caused by a first radio frequency (RF) chain for receiving the first reference signal and a second radio frequency (RF) chain for receiving the second reference signal,
   wherein
      the transmitting includes transmitting the feedback signal including information about the phase difference to the transmission user equipment (UE); and
      the distance between the transmission user equipment (UE) and the reception user equipment (UE) is calculated based on the phase difference information.

5. The method according to claim 1, further comprising:
   calculating a time difference between a first transmission time point where the transmission user equipment (UE) transmits the first reference signal and a second transmission time point where the transmission user equipment (UE) transmits the second reference signal, based on a time difference between a first reception time point where the reception user equipment (UE) receives the first reference signal and a second reception time point where the reception user equipment (UE) receives the second reference signal.

6. The method according to claim 5, wherein the feedback signal further includes:
   information about a time difference between the first reception time point where the reception user equipment (UE) receives the first reference signal and the second reception time point where the reception user equipment (UE) receives the second reference signal.

7. The method according to claim 5, wherein:
the feedback signal includes a first feedback signal corresponding to the first reference signal and a second feedback signal corresponding to the second reference signal,
the method further comprises:
- transmitting, by the reception user equipment (UE), at least one of first information about a time difference between the first reception time point and a third transmission time point where the reception user equipment (UE) transmits the first feedback signal, and second information about a time difference between the second reception time point and a fourth transmission time point where the reception user equipment (UE) transmits the second feedback signal, to the transmission user equipment (UE), and
- the distance between the transmission user equipment (UE) and the reception user equipment (UE) is calculated based on at least one of the first information indicating a time difference between the third transmission time point and the first reception time point and the second information indicating a time difference between the fourth transmission time point and the second reception time point.

8. The method according to claim 1, wherein:
the feedback signal includes a first feedback signal corresponding to the first reference signal and a second feedback signal corresponding to the second reference signal,
the method further comprises:
- transmitting, by the reception user equipment (UE), at least one of first information about a time difference between the third transmission time point where the reception user equipment (UE) transmits the first feedback signal and the fourth transmission time point where the reception user equipment (UE) transmits the second feedback signal, to the transmission user equipment (UE), and
- the distance between the transmission user equipment (UE) and the reception user equipment (UE) is calculated based on information about a time difference between the third transmission time point and the fourth transmission time point.

9. The method according to claim 1, wherein:
the distance between the transmission user equipment (UE) and the reception user equipment (UE) is calculated further based on a time difference between a transmission time point where the first reference signal is transmitted and a transmission time point where the second reference signal is transmitted.

10. The method according to claim 1, wherein:
the reference signal is a reference signal for positioning or a reference signal for ranging.

11. A reception user equipment (UE) for transmitting a feedback signal in a wireless communication system comprising:
a transceiver; and
a processor,
wherein
the processor is configured to:
receive a first reference signal and a second reference signal from a transmission user equipment (UE); and
transmit the feedback signal to the transmission user equipment (UE) based on the first reference signal and the second reference signal,
wherein
the feedback signal includes information about a time difference between a first FFT (Fast Fourier Transform) window for receiving the first reference signal and a second FFT window for receiving the second reference signal; and
a distance between the transmission user equipment (UE) and the reception user equipment (UE) is calculated based on a time difference between the first FFT window and the second FFT window.

12. The reception user equipment (UE) according to claim 11, wherein:
the reception user equipment (UE) is configured to communicate with at least one of a mobile terminal, a network, and an autonomous vehicle other than the device.

13. The reception user equipment (UE) according to claim 11, wherein:
the reception user equipment (UE) is configured to implement at least one advanced driver assistance system (ADAS) function based on a signal for controlling movement of the reception user equipment (UE).

14. The reception user equipment (UE) according to claim 11, wherein:
the reception user equipment (UE) receives a user input signal from a user, switches a driving mode of the device from an autonomous driving mode to a manual driving mode, or switches a driving mode of the device from the manual driving mode to the autonomous driving mode.

15. The reception user equipment (UE) according to claim 11, wherein:
the reception user equipment (UE) is autonomously driven based on external object information,
wherein the external object information includes at least one of information indicating presence or absence of an object, position information of the object, information about a distance between the reception user equipment (UE) and the object, and information about a relative speed between the reception user equipment (UE) and the object.

* * * * *